US012432575B2

(12) United States Patent
Bai et al.

(10) Patent No.: US 12,432,575 B2
(45) Date of Patent: Sep. 30, 2025

(54) DISABLING BEAM PREDICTION OUTPUTS

(71) Applicant: QUALCOMM Incorporated, San Diego, CA (US)

(72) Inventors: Tianyang Bai, Somerville, NJ (US); Navid Abedini, Basking Ridge, NJ (US); Aria Hasanzadezonuzy, Somerville, NJ (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 18/045,988

(22) Filed: Oct. 12, 2022

(65) Prior Publication Data

US 2024/0129750 A1    Apr. 18, 2024

(51) Int. Cl.
*H04W 24/10* (2009.01)
*H04W 16/28* (2009.01)

(52) U.S. Cl.
CPC ........... *H04W 16/28* (2013.01); *H04W 24/10* (2013.01)

(58) Field of Classification Search
CPC .............................. H04W 16/28; H04W 24/10
See application file for complete search history.

(56) References Cited

U.S. PATENT DOCUMENTS

| 2024/0056844 A1* | 2/2024 | Zhu | H04W 16/28 |
| 2025/0048129 A1* | 2/2025 | Medra | H04W 4/027 |

* cited by examiner

*Primary Examiner* — Chuong A Ngo
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive, from a network node, a configuration of a beam prediction model that is trained to predict beam measurements for a set of beams. The UE may receive, from the network node, an indication of a subset of beams, from the set of beams, that are to be associated with a measurement report. The UE may transmit, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams. Numerous other aspects are provided.

30 Claims, 11 Drawing Sheets

DISABLING BEAM PREDICTION OUTPUTS

FIELD OF THE DISCLOSURE

Aspects of the present disclosure generally relate to wireless communication and specifically, to techniques and apparatuses for disabling beam prediction outputs.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, a user equipment (UE) and/or a network node may utilize artificial intelligence (AI) and/or machine learning (ML) (AI/ML) to facilitate one or more wireless communication functions. For example, an AI/ML model may be deployed at, or on, a UE. The AI/ML model may enable the UE to determine one or more inferences or predictions based on data input to the AI/ML model. In some examples, the network node may train and/or configure the AI/ML model (for example, may select a model structure and/or identify a parameter set). For example, the network node may train and/or configure the AI/ML model to output predicted beam measurements based on one or more actual beam measurements that are provided as an input to the AI/ML model. The network node may transmit, and the UE may receive, a configuration of the AI/ML model (for example, the UE may receive an indication of a model structure and a parameter set) to be deployed by the UE.

In some cases, a beam associated with the output of the AI/ML model may be unavailable and/or may be otherwise not selected by a network node. For example, the AI/ML model may be trained and/or configured (for example, based on the model structure and the parameter set) to output predicted measurement values associated with a set of beams. In some cases, one or more beams (for example, a subset of beams) from the set of beams may be unavailable and/or may be otherwise not selected by a network node. For example, the one or more beams may be associated with a high traffic load at the network node (for example, a high quantity of UEs may be using the one or more beams for communications with the network node). As another example, the one or more beams may be associated with a network node (for example, a repeater or relay station) that is operating in an energy saving mode and/or is operating in a sleep mode. As another example, the one or more beams may be associated with a poor prediction accuracy. To cause the UE to not report information associated with the one or more beams, the network node may reconfigure the AI/ML model. For example, the network node may retrain and/or reconfigure the AI/ML model to change the model structure and/or the parameter set to cause an output of the AI/ML model to not include predictions associated with the one or more beams. Retraining and/or reconfiguring the AI/ML model may consume processing resources, may introduce latency associated with beam predictions, and/or may consume network resources associated with transmitting an indication of the retrained and/or reconfigured AI/ML model.

SUMMARY

Some aspects described herein relate to a user equipment (UE) for wireless communication. The UE may include at least one memory and at least one processor communicatively coupled with the at least one memory. The at least one processor may be configured to cause the UE to receive, from a network node, a configuration of a beam prediction model that is trained to predict beam measurements for a set of beams. The at least one processor may be configured to cause the UE to receive, from the network node, an indication of a subset of beams, from the set of beams, that are to be associated with a measurement report. The at least one processor may be configured to cause the UE to transmit, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams.

Some aspects described herein relate to a network node for wireless communication. The network node may include at least one memory and at least one processor communicatively coupled with the at least one memory. The at least one processor may be configured to cause the network node to transmit a configuration, associated with a UE, of a beam prediction model that is trained to predict beam measurements for a set of beams. The at least one processor may be configured to cause the network node to transmit an indication, associated with the UE, of a subset of beams, from the set of beams, that are to be associated with a measurement report. The at least one processor may be configured to cause the network node to receive the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams.

Some aspects described herein relate to a method of wireless communication performed by a UE. The method may include receiving, from a network node, a configuration of a beam prediction model that is trained to predict beam measurements for a set of beams. The method may include receiving, from the network node, an indication of a subset of beams, from the set of beams, that are to be associated with a measurement report. The method may include transmitting, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams.

Some aspects described herein relate to a method of wireless communication performed by a network node. The method may include transmitting a configuration, associated with a UE, of a beam prediction model that is trained to predict beam measurements for a set of beams. The method may include transmitting an indication, associated with the UE, of a subset of beams, from the set of beams, that are to be associated with a measurement report. The method may include receiving the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams.

Some aspects described herein relate to a non-transitory computer-readable medium that stores a set of instructions for wireless communication by a UE. The set of instructions, when executed by one or more processors of the UE, may cause the UE to receive, from a network node, a configuration of a beam prediction model that is trained to predict beam measurements for a set of beams. The set of instructions, when executed by one or more processors of the UE, may cause the UE to receive, from the network node, an indication of a subset of beams, from the set of beams, that are to be associated with a measurement report. The set of instructions, when executed by one or more processors of the UE, may cause the UE to transmit, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams.

Some aspects described herein relate to a non-transitory computer-readable medium that stores a set of instructions for wireless communication by a network node. The set of instructions, when executed by one or more processors of the network node, may cause the network node to transmit a configuration, associated with a UE, of a beam prediction model that is trained to predict beam measurements for a set of beams. The set of instructions, when executed by one or more processors of the network node, may cause the network node to transmit an indication, associated with the UE, of a subset of beams, from the set of beams, that are to be associated with a measurement report. The set of instructions, when executed by one or more processors of the network node, may cause the network node to receive the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams.

Some aspects described herein relate to an apparatus for wireless communication. The apparatus may include means for receiving, from a network node, a configuration of a beam prediction model that is trained to predict beam measurements for a set of beams. The apparatus may include means for receiving, from the network node, an indication of a subset of beams, from the set of beams, that are to be associated with a measurement report. The apparatus may include means for transmitting, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams.

Some aspects described herein relate to an apparatus for wireless communication. The apparatus may include means for transmitting a configuration, associated with a UE, of a beam prediction model that is trained to predict beam measurements for a set of beams. The apparatus may include means for transmitting an indication, associated with the UE, of a subset of beams, from the set of beams, that are to be associated with a measurement report. The apparatus may include means for receiving the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
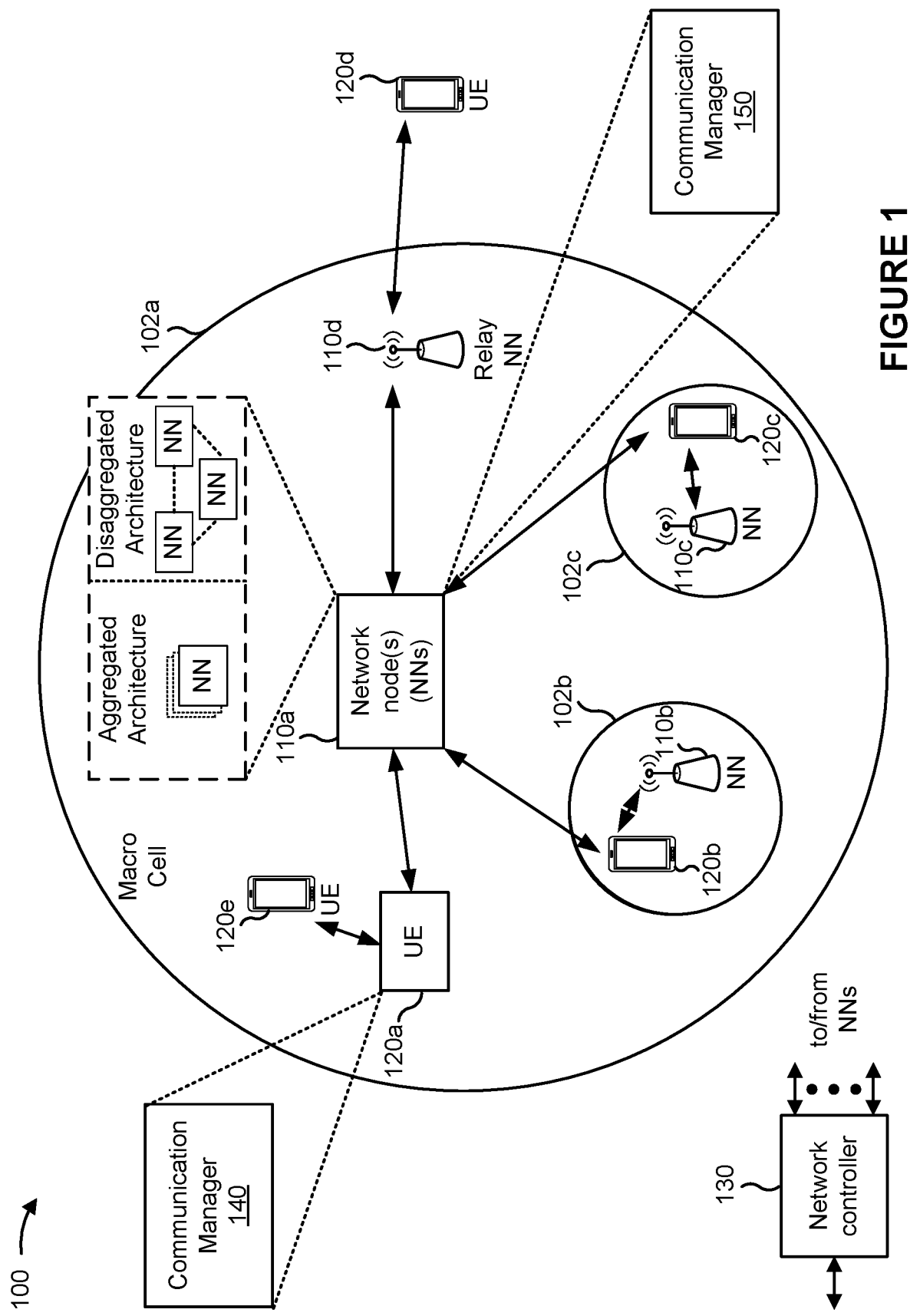
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to disabling beam prediction outputs of a beam prediction model (for example, an artificial intelligence (AI) and/or machine learning (ML) (AI/ML) model trained to output beam measurement predictions). Some aspects more specifically relate to a network node indicating one or more beams, from a set of beams associated with an output of the beam prediction model, that are available (for example, to be considered by a user equipment (UE) when reporting predicted beam measurements) or that are disabled (for example, to be ignored by the UE when reporting predicted beam measurements). In some aspects, the UE may receive, from the network node, a configuration of the beam prediction model that is trained to predict beam measurements for the set of beams. The UE may receive, from the network node, an indication of a subset of beams, from the set of beams, that are to be associated with a measurement report.

In some aspects, the indication of the subset of beams may include an indication of one or more beams that are to be disabled for the beam prediction model. In some other aspects, the indication of the subset of beams may include an indication of one or more beams that are to be available or active for the beam prediction model. In such examples, the UE may identify the beam(s) that are to be disabled for the beam prediction model based on the beams, from the set of beams, that are not included in the one or more beams that are to be available or active for the beam prediction model.

The UE may transmit, to the network node, the measurement report. The measurement report may indicate one or more predicted beam measurements that are based at least in part on an output of the beam prediction model. In some aspects, the output of the beam prediction model may include beam predictions associated with the set of beams. The one or more predicted beam measurements included in the measurement report may include information associated with the subset of beams. In other words, the UE may refrain from including information (for example, an indication of a beam and/or a prediction measurement of the beam) for one or more beams, from the set of beams, that are not included in the subset of beams (for example, as indicated by the network node as described elsewhere herein).

Particular aspects of the subject matter described in this disclosure can be implemented to realize one or more of the following potential advantages. In some examples, the described techniques can be used to enable a network node and a UE to disable one or more beams associated with an output of a trained beam prediction model. This may conserve processing resources and/or network resources that would have otherwise been used to reconfigure or retrain the beam prediction model and transmit a configuration of the reconfigured or the retrained beam prediction model to the UE. Additionally, this may reduce a latency or delay associated with the UE providing predicted beam measurements that would have otherwise been introduced associated with the network node reconfiguring and/or retraining the beam prediction model (for example, because a delay would otherwise be introduced associated with an amount of time associated with the network node reconfiguring and/or retraining the beam prediction model). Further, this may conserve processing resources that would have otherwise been used by the network node to process and/or analyze predicted beam measurements for beams that are unavailable and/or may be otherwise not selected by the network node.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, a configuration of a beam prediction model that is trained to predict beam measurements for a set of beams; receive, from the network node, an indication of a subset of beams, from the set of beams, that are to be associated with a measurement report; and transmit, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams. Additionally or alternatively, the communication manager 140 may perform one or more other operations described herein.

In some aspects, the network node 110 may include a communication manager 150. As described in more detail elsewhere herein, the communication manager 150 may transmit a configuration, associated with a UE, of a beam prediction model that is trained to predict beam measurements for a set of beams; transmit an indication, associated with the UE, of a subset of beams, from the set of beams, that are to be associated with a measurement report; and receive the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams. Additionally or alternatively, the communication manager 150 may perform one or more other operations described herein.

Figure 2:
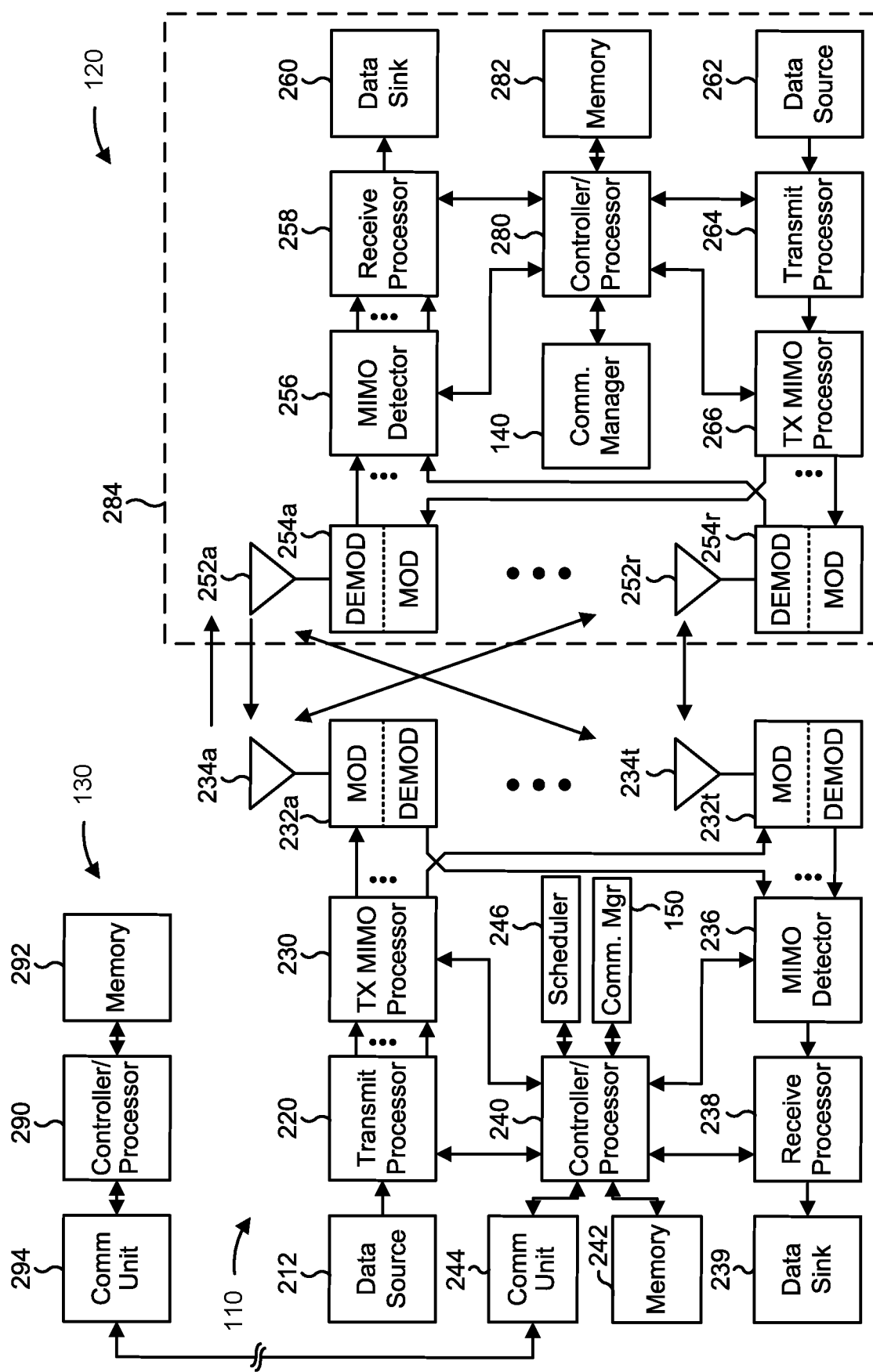
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with disabling beam prediction outputs, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions, among other examples.

In some aspects, the UE 120 includes means for receiving, from a network node, a configuration of a beam prediction model that is trained to predict beam measurements for a set of beams; means for receiving, from the network node, an indication of a subset of beams, from the set of beams, that are to be associated with a measurement report; and/or means for transmitting, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a configuration, associated with a UE, of a beam prediction model that is trained to predict beam measurements for a set of beams; means for transmitting an indication, associated with the UE, of a subset of beams, from the set of beams, that are to be associated with a measurement report; and/or means for receiving the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
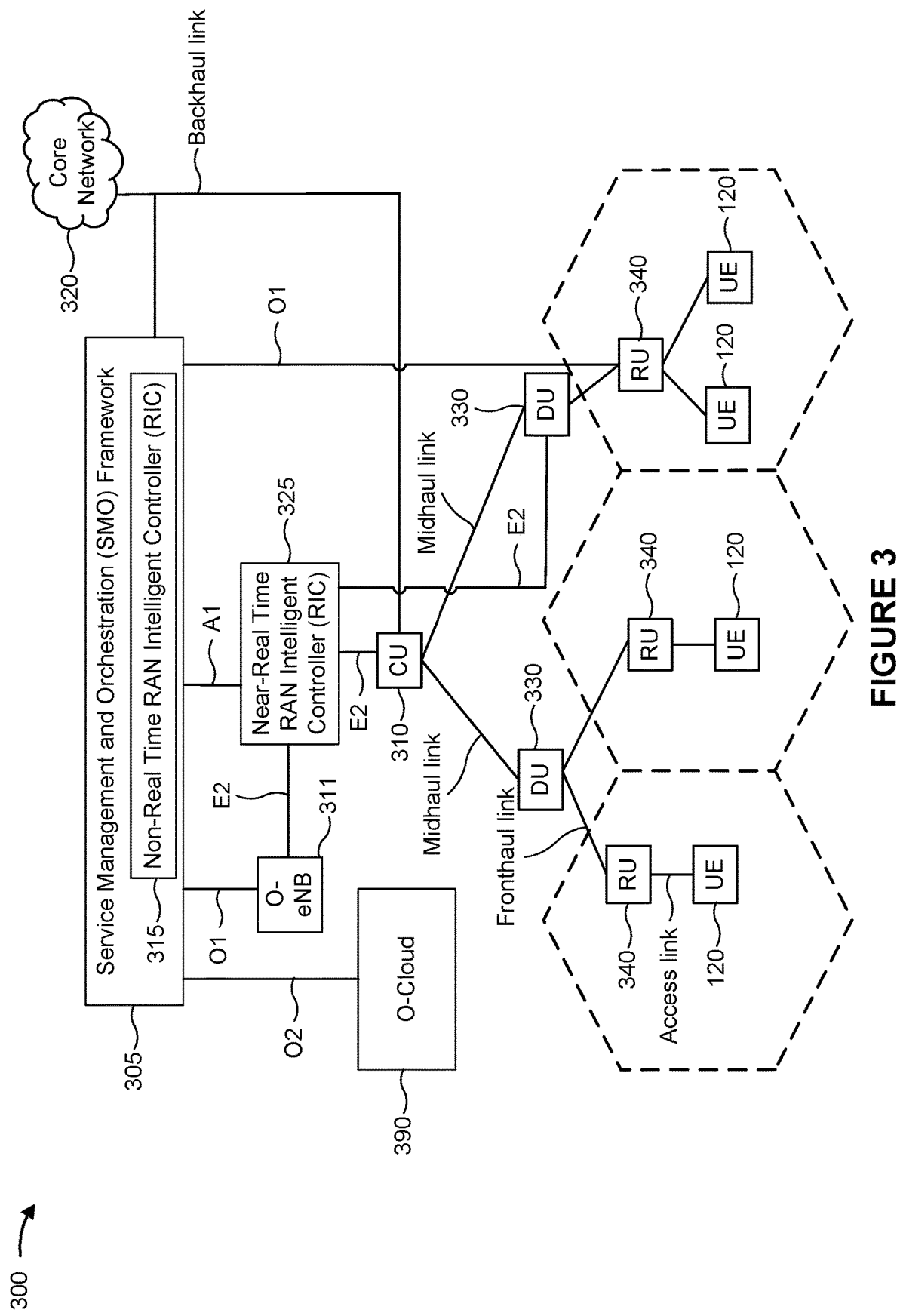
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT MC 315 may be configured to include a logical function that enables non-real-time control and optimization of RAN elements and resources, AI/ML workflows including model training and updates, or policy-based guidance of applications/features in the Near-RT MC 325. The Non-RT MC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
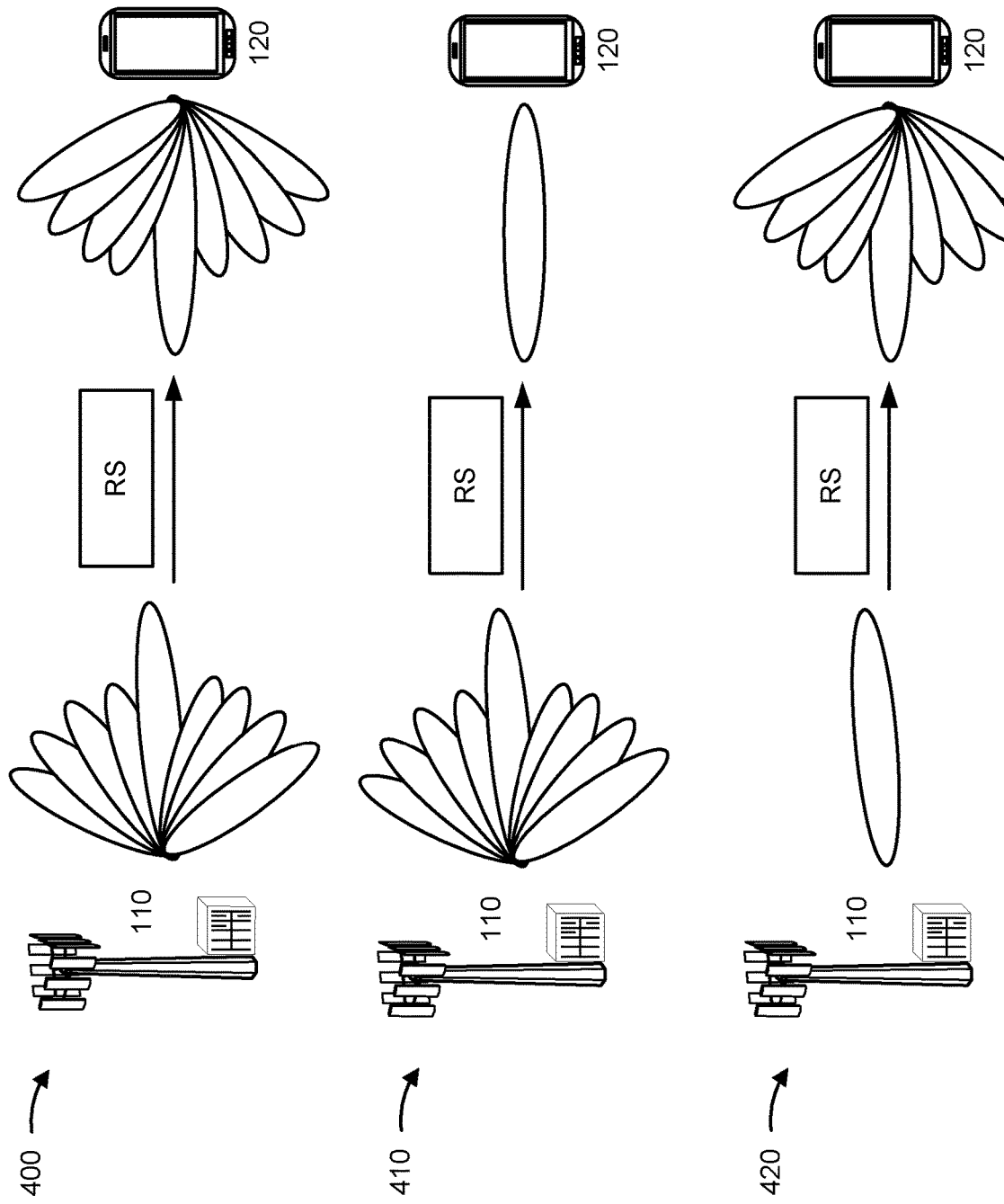
FIG. 4 is a diagram illustrating examples of beam management procedures in accordance with the present disclosure.

FIG. 4 is a diagram illustrating examples of beam management procedures 400, 410, and 420, in accordance with the present disclosure. As shown in FIG. 4, the beam management procedures 400, 410, and 420 include a UE 120 in communication with a network node 110 in a wireless network (for example, wireless network 100). However, the devices shown in FIG. 4 are provided as examples, and the wireless network may support communication and beam management between other devices (for example, between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (for example, an RRC connected state).

As shown in FIG. 4, a beam management procedure 400 may include a network node 110 (for example, one or more network node devices such as an RU, a DU, and/or a CU, among other examples) and a UE 120 communicating to perform beam management using channel state information (CSI) reference signals (CSI-RSs). The beam management procedure 400 may be a first beam management procedure (for example, P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and the beam management procedure 400, CSI-RSs may be configured to be transmitted from the network node 110 to the UE 120. The CSI-RSs may be configured to be periodic (for example, using RRC signaling), semi-persistent (for example, using MAC control element (MAC-CE) signaling), and/or aperiodic (for example, using downlink control information (DCI)).

The beam management procedure 400 may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (for example, with repetitions) each CSI-RS at multiple times within the same reference signal (RS) resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While the beam management procedure 400 has been described in connection with CSI-RSs, the beam management procedure 400 may also use synchronization signal blocks (SSBs) for beam management in a similar manner as described above.

As shown in FIG. 4, a beam management procedure 410 may include a network node 110 and a UE 120 communicating to perform beam management using CSI-RSs. The beam management procedure 410 may be a second beam management procedure (for example, P2 CSI-RS beam management). The beam management procedure 410 may be referred to as a beam refinement procedure, a network node beam refinement procedure, a TRP beam refinement procedure, and/or a transmit beam refinement procedure. As shown in FIG. 4 and the beam management procedure 410, CSI-RSs may be configured to be transmitted from the network node 110 to the UE 120. The CSI-RSs may be configured to be aperiodic (for example, using DCI). The second beam management procedure may include the network node 110 performing beam sweeping over one or more transmit beams. The one or more transmit beams may be a subset of all transmit beams associated with the network node 110 (for example, determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (for example, a same) receive beam (for example, determined based at least in part on measurements performed in connection with the first beam management procedure). The beam management procedure 410 may enable the network node 110 to select a best transmit beam based at least in part on measurements of the CSI-RSs (for example, measured by the UE 120 using the single receive beam) reported by the UE 120. The beam management procedure 410 may also use SSBs (for example, rather than CSI-RSs) for beam management in a similar manner as described above.

As shown in FIG. 4, a beam management procedure 420 may be a third beam management procedure (for example, P3 CSI-RS beam management). The beam management procedure 420 may be referred to as a beam refinement procedure, a UE beam refinement procedure, and/or a receive beam refinement procedure. As shown in FIG. 4 and the beam management procedure 420, one or more CSI-RSs may be configured to be transmitted from the network node 110 to the UE 120. The CSI-RSs may be configured to be aperiodic (for example, using DCI). The beam management procedure 420 may include the network node 110 transmitting the one or more CSI-RSs using a single transmit beam (for example, determined based at least in part on measurements reported by the UE 120 in connection with the first beam management procedure and/or the second beam management procedure). To enable the UE 120 to perform receive beam sweeping, the network node may use a transmit beam to transmit (for example, with repetitions) CSI-RS at multiple times within the same RS resource set so that UE 120 can sweep through one or more receive beams in multiple transmission instances. The one or more receive beams may be a subset of all receive beams associated with the UE 120 (for example, determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (for example, of the CSI-RS of the transmit beam using the one or more receive beams). The beam management procedure 420 may also use SSBs (for example, rather than CSI-RSs) for beam management in a similar manner as described above.

Wireless networks may operate at higher frequency bands, such as within millimeter wave (mmW) bands (for example, FR2 above 28 GHz, FR4 above 60 GHz, or THz band above 100 GHz, among other examples), to offer high data rates. For example, wireless devices, such as a network node and a UE, may communicate with each other through beamforming techniques to increase communication speed and reliability. The beamforming techniques may enable a wireless device to transmit a signal towards a given direction instead of transmitting an omnidirectional signal in all directions. In some examples, the wireless device may transmit a signal from multiple antenna elements using a common wavelength and phase for the transmission from the multiple antenna elements, and the signal from the multiple antenna elements may be combined to create a combined signal with a longer range and a more directed beam. The beamwidth of the signal may vary based on the transmitting frequency. For example, the width of a beam may be inversely related to the frequency, where the beamwidth may decrease as the transmitting frequency increases because more radiating elements may be placed per given area at a transmitter due to smaller wavelength. As a result, higher frequency bands (for example, THz or sub-THz frequency bands) may enable wireless devices to form much narrower beam structures (for example, pencil beams, laser beams, or narrow beams, among other examples) compared to the beam structures under the FR2 or below because more radiating elements may be placed per given area at the antenna element due to smaller wavelength. The higher frequency bands may have short delay spread (for example, a few nanoseconds) and may be translated into coherence frequency bandwidth of tens (10s) of MHz. In addition, the higher frequency bands may provide a large available bandwidth, which may be occupied by larger bandwidth carriers, such as 1000 MHz per carrier or above. In some examples, the transmission path of a narrower beam may be more likely to be tailored to a receiver, such that the transmission may be more likely to meet a line-of-sight (LOS) condition as the narrower beam may be more likely to reach the receiver without being obstructed by obstacle(s). Also, as the transmission path may be narrow, reflection and/or refraction may be less likely to occur for the narrower beam.

While higher frequency bands may provide narrower beam structures and higher transmission rates, higher frequency bands may also encounter higher attenuation and diffraction losses, where a blockage of an LOS path may degrade a wireless link quality. For example, when two wireless devices are communicating with each other based on a LOS path at a higher frequency band and the LOS path is blocked by an obstacle, such as pedestrians, buildings, and/or vehicles, among other examples, the received power may drop significantly. As a result, wireless communications based on higher frequency bands may be more susceptible to environmental changes compared to lower frequency bands. To ensure that the UE 120 and the network node 110 are communicating using a best beam or beam pair, beam management procedures (for example, such as the beam management procedures described in connection with FIG. 4) may be performed by the UE 120 and/or the network node 110. However, because higher frequency bands may be more susceptible to environmental changes compared to lower frequency bands, the beam management procedures may be performed more frequently and/or using additional beams. This may introduce significant overhead and consume network resources, processing resources, and/or power resources of a UE (and/or a network node) associated with performing the beam management procedures.

Figure 5:
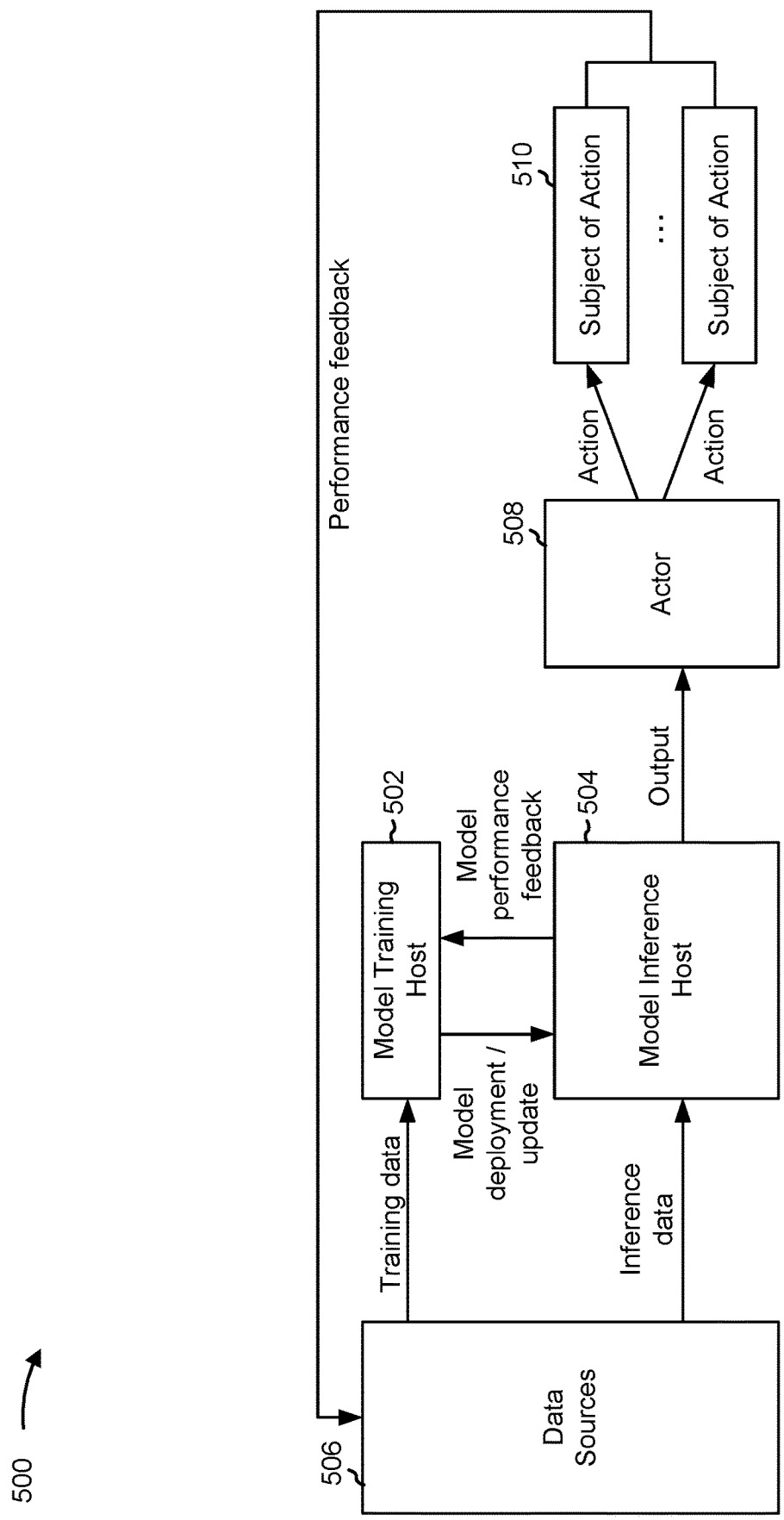
FIG. 5 is a diagram illustrating an example architecture of a functional framework for radio access network (RAN) intelligence enabled by data collection in accordance with the present disclosure.

FIG. 5 is a diagram illustrating an example architecture 500 of a functional framework for RAN intelligence enabled by data collection, in accordance with the present disclosure. In some scenarios, the functional framework for RAN intelligence may be enabled by further enhancement of data collection through use cases and/or examples. For example, principles or algorithms for RAN intelligence enabled by AI/ML and the associated functional framework (for example, the AI functionality and/or the input/output of the component for AI enabled optimization) have been utilized or studied to identify the benefits of AI enabled RAN through possible use cases (for example, beam management, energy saving, load balancing, mobility management, and/or coverage optimization, among other examples). In one example, as shown by the architecture 500, a functional framework for RAN intelligence may include multiple logical entities, such as a model training host 502, a model inference host 504, data sources 506, and an actor 508.

The model inference host 504 may be configured to run an AI/ML model based on inference data provided by the data sources 506, and the model inference host 504 may produce an output (for example, a prediction) with the inference data input to the actor 508. The actor 508 may be an element or an entity of a core network or a RAN. For example, the actor 508 may be a UE, a network node, a base station (for example, a gNB), a CU, a DU, and/or an RU, among other examples. Additionally, the actor 508 may also depend on the type of tasks performed by the model inference host 504, type of inference data provided to the model inference host 504, and/or type of output produced by the model inference host 504. For example, if the output from the model inference host 504 is associated with beam management, the actor 508 may be a UE, a DU or an RU. As another example, if the output from the model inference host 504 is associated with Tx/Rx scheduling, the actor 508 may be a CU or a DU.

After the actor 508 receives an output from the model inference host 504, the actor 508 may determine whether to act based on the output. For example, if the actor 508 is a DU or an RU and the output from the model inference host 504 is associated with beam management, the actor 508 may determine whether to change/modify a Tx/Rx beam based on the output. If the actor 508 determines to act based on the output, the actor 508 may indicate the action to at least one subject of action 510. For example, if the actor 508 determines to change/modify a Tx/Rx beam for a communication between the actor 508 and the subject of action 510 (for example, a UE 120), then the actor 508 may transmit a beam (re-)configuration or a beam switching indication to the subject of action 510. The actor 508 may modify its Tx/Rx beam based on the beam (re-)configuration, such as switching to a new Tx/Rx beam or applying different parameters for a Tx/Rx beam, among other examples. As another example, the actor 508 may be a UE and the output from the model inference host 504 may be associated with beam management. For example, the output may be one or more predicted measurement values for one or more beams. The actor 508 (for example, a UE) may determine that a measurement report (for example, a Layer 1 (L1) RSRP report) is to be transmitted to a network node 110.

The data sources 506 may also be configured for collecting data that is used as training data for training an ML model or as inference data for feeding an ML model inference operation. For example, the data sources 506 may collect data from one or more core network and/or RAN entities, which may include the subject of action 510, and provide the collected data to the model training host 502 for ML model training. For example, after a subject of action 510 (for example, a UE 120) receives a beam configuration from the actor 508, the subject of action 510 may provide performance feedback associated with the beam configuration to the data sources 506, where the performance feedback may be used by the model training host 502 for monitoring or evaluating the ML model performance, such as whether the output (for example, prediction) provided to the actor 508 is accurate. In some examples, if the output provided by the actor 508 is inaccurate (or the accuracy is below an accuracy threshold), then the model training host 502 may determine to modify or retrain the ML model used by the model inference host, such as via an ML model deployment/update.

Figure 6:
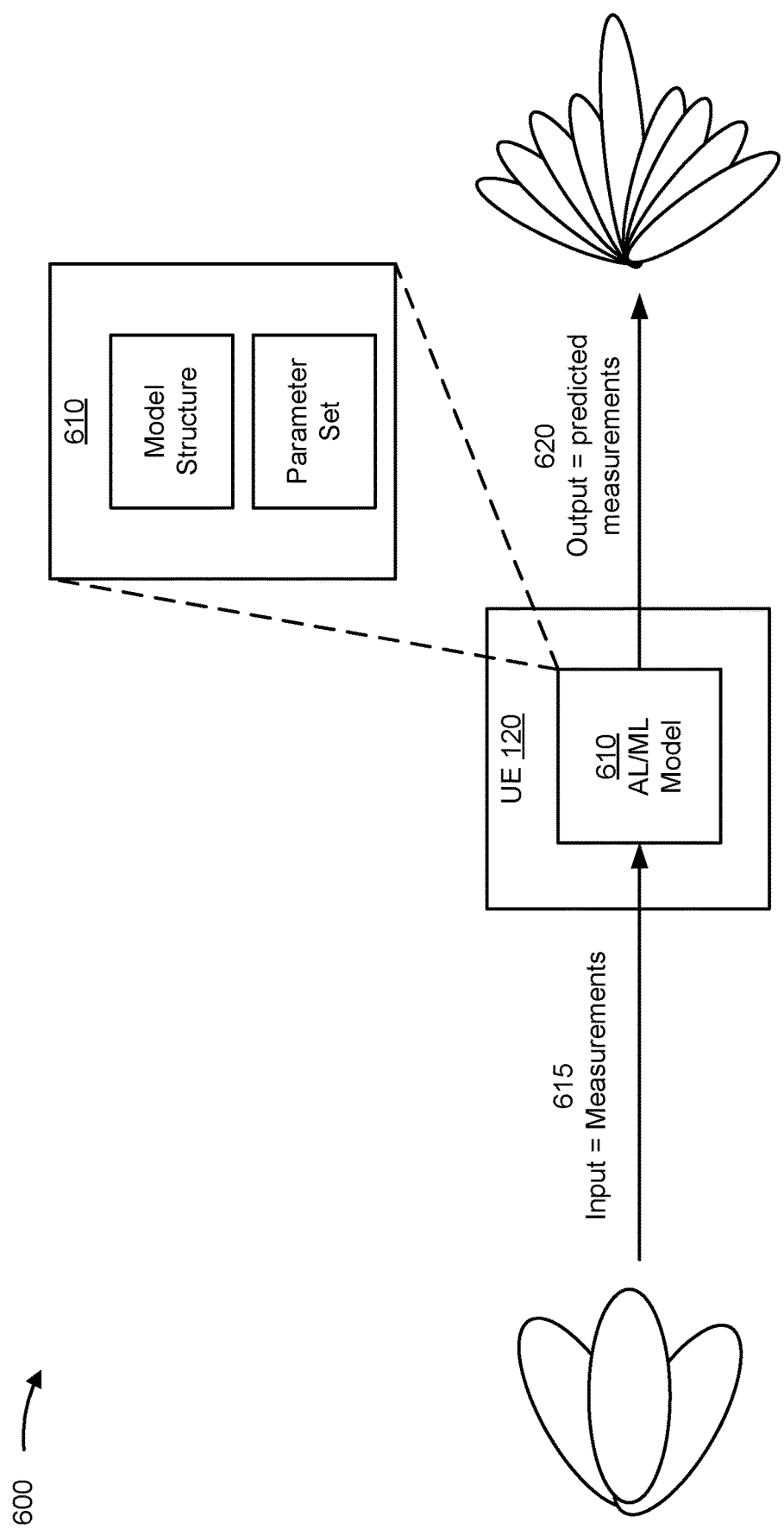
FIG. 6 is a diagram illustrating an example of artificial intelligence (AI) and/or machine learning (ML) (AI/ML) based beam management in accordance with the present disclosure.

FIG. 6 is a diagram illustrating an example of AI/ML based beam management 600, in accordance with the present disclosure. As shown in FIG. 6, an AI/ML model 610 may be deployed at or on a UE 120. For example, a model inference host (such as a model inference host 504) may be deployed at, or on, a UE 120. The AI/ML model 610 may enable the UE 120 to determine one or more inferences or predictions based on data input to the AI/ML model 610.

The AI/ML model 610 may include a neural network model or a neural network function. The neural network model or the neural network function may be trained to output Y based on an input X. For example, as described elsewhere herein, the input X may be measurement values (for example, RSRP measurement values) of one or more beams. The output Y may be predicted measurement values (for example, predicted future measurement values) of the one or more beams and/or of one or more other beams. As shown in FIG. 6, the neural network may be defined as a model structure and a parameter set. The model structure may include a type of neural network (for example, a convolutional neural network, a recurrent neural network, a feedforward neural network, a modular neural network, and/or another type of neural network), a quantity of layers associated with the neural network, and/or other architectural parameters associated with the neural network. The model structure may be associated with a model structure identifier. The model structure identifier may be a unique identifier (for example, in a wireless network) to enable network nodes, UEs, or other devices to identify the model structure. The model structure may be linked to, or associated with, the neural network function. The neural network function may be linked to, or associated with, the AI/ML model 610. In some examples, the AI/ML model 610 may include, or be associated with, multiple model structures.

The parameter set may include weights and/or coefficients associated with the neural network of the AI/ML model 610 and/or other configuration parameters of the AI/ML model 610. In some examples, different parameter sets may be used with the same model structure (for example, based on training or an intended use of the AI/ML model 610). For example, the parameter set may be based on a location of a device (for example, a network node or a UE) that is deploying the AI/ML model 610. Additionally, the parameter set may be based on a configuration for the AI/ML model 610.

In some examples, the AI/ML model 610 may be deployed or executed by a network node 110. For example, the network node 110 may train and/or configure the AI/ML model 610 (for example, may select a model structure and/or identify a parameter set). The network node 110 may receive, from a UE 120, one or more measurements associated with a first set of beams. The network node 110 may provide the one or more measurements as an input to the AI/ML model 610. An output of the AI/ML model 610 may include predicted measurement values associated with the first set of beams and/or predicted measurement values associated with a second set of beams. In other examples, the AI/ML model 610 may be deployed or executed by a UE 120. For example, a network node 110 may train and/or configure the AI/ML model 610. The network node 110 may transmit, and the UE 120 may receive, a configuration of the AI/ML model 610 (for example, may receive an indication of a model structure and a parameter set).

For example, in a first operation 615, an input to the AI/ML model 610 may include measurements associated with a first set of beams. For example, a network node 110 may transmit one or more signals using respective beams from the first set of beams. The UE 120 may perform measurements (for example, L1 RSRP measurements or other measurements) of the first set of beams to obtain a first set of measurements. For example, each beam, from the first set of beams, may be associated with one or more measurements performed by the UE 120. The UE 120 may input the first set of measurements (for example, L1 RSRP measurement values) into the AI/ML model 610 along with information associated with the first set of beams and/or a second set of beams, such as a beam direction (for example, spatial direction), beam width, beam shape, and/or other characteristics of the respective beams from the first set of beams and/or the second set of beams.

In a second operation 620, the AI/ML model 610 may output one or more predictions. The one or more predictions may include predicted measurement values (for example, predicted L1 RSRP measurement values) associated with the first set of beams and/or with the second set of beams. For example, the first set of beams and the second set of beams may be the same set of beams, may include one or more common beams, or may be mutually exclusive sets of beams. This may reduce a quantity of beam measurements that are performed by the UE 120, thereby conversing power of the UE 120 and/or network resources that would have otherwise been used to measure all beams included in the first set of beams and the second set of beams. This type of prediction may be referred to as a spatial domain selection or prediction. In examples where the first set of beams and the second set of beams are the same set of beams, the prediction may be referred to as a time domain selection or prediction.

As another example, an output of the AI/ML model 610 may include a point-direction, an angle of departure (AoD), and/or an angle of arrival (AoA) of a beam included in the second set of beams. This type of prediction may be referred to as a non-codebook based spatial domain selection or prediction. As another example, multiple measurement report or values, collected at different points in time, may be an input to the AI/ML model 610. This may enable the AI/ML model 610 to output codebook based and/or non-codebook based predictions for a measurement value, an AoD, and/or an AoA, among other examples, of a beam at a future time. The output(s) of the AI/ML model 610, as described herein, may facilitate initial access procedures, secondary cell group (SCG) setup procedures, beam refinement procedures (for example, a P2 beam management procedure or a P3 beam management procedure as described above in connection with FIG. 4), link quality or interference adaptation procedure, beam failure and/or beam blockage predictions, and/or radio link failure predictions, among other examples.

In some cases, a beam associated with an output of the AI/ML model 610 may be unavailable and/or may be otherwise not selected by a network node. For example, the AI/ML model 610 may be trained and/or configured (for example, based on the model structure and the parameter set) to output predicted measurement values associated with a set of beams. In some cases, one or more beams (for example, a subset of beams) from the set of beams may be unavailable and/or may be otherwise not selected by a network node. For example, the one or more beams may be associated with a high traffic load at the network node (for example, a high quantity of UEs may be using the one or more beams for communications with the network node). As another example, the one or more beams may be associated with a network node (for example, a repeater or relay station) that is operating in an energy saving mode and/or is operating in a sleep mode. As another example, the one or more beams may be associated with a poor prediction accuracy. For example, a training set associated with the AI/ML model 610 may not include sufficient data points associated with the one or more beams to train the AI/ML model 610 to accurately predict measurement values associated with the AI/ML model 610. However, to cause the UE 120 to not report information associated with the one or more beams, the network node 110 may reconfigure the AI/ML model 610. For example, the network node 110 may retrain and/or reconfigure the AI/ML model 610 to change the model structure and/or the parameter set to cause an output of the AI/ML model 610 to not include predictions associated with the one or more beams. Retraining and/or reconfiguring the AI/ML model 610 may consume processing resources, may introduce latency associated with beam predictions, and/or may consume network resources associated with transmitting an indication of the retrained and/or reconfigured AI/ML model 610.

Various aspects relate generally to disabling beam prediction outputs of a beam prediction model (for example, an AI/ML model trained to output beam measurement predictions). Some aspects more specifically relate to a network node indicating one or more beams, from a set of beams associated with an output of the beam prediction model, that are available (for example, to be considered by a UE when reporting predicted beam measurements) or that are disabled (for example, to be ignored by the UE when reporting predicted beam measurements). In some aspects, the UE may receive, from the network node, a configuration of the beam prediction model that is trained to predict beam measurements for the set of beams. The UE may receive, from the network node, an indication of a subset of beams, from the set of beams, that are to be associated with a measurement report.

In some aspects, the indication of the subset of beams may include an indication of one or more beams that are to be disabled for the beam prediction model. In some other aspects, the indication of the subset of beams may include an indication of one or more beams that are to be available or active for the beam prediction model. In such examples, the UE may identify the beam(s) that are to be disabled for the beam prediction model based on the beams, from the set of beams, that are not included in the one or more beams that are to be available or active for the beam prediction model.

The UE may transmit, to the network node, the measurement report. The measurement report may indicate one or more predicted beam measurements that are based at least in part on an output of the beam prediction model. In some aspects, the output of the beam prediction model may include beam predictions associated with the set of beams. The one or more predicted beam measurements indicated in the measurement report may include information associated with the subset of beams. In other words, the UE may refrain from including information (for example, an indication of a beam and/or a prediction measurement of the beam) for one or more beams, from the set of beams, that are not included in the subset of beams (for example, as indicated by the network node as described elsewhere herein).

Particular aspects of the subject matter described in this disclosure can be implemented to realize one or more of the following potential advantages. In some examples, the described techniques can be used to enable a network node and a UE to disable one or more beams associated with an output of a trained beam prediction model. This may conserve processing resources and/or network resources that would have otherwise been used to reconfigure or retrain the beam prediction model and transmit a configuration of the reconfigured or the retrained beam prediction model to the UE. Additionally, this may reduce a latency or delay associated with the UE providing predicted beam measurements that would have otherwise been introduced associated with the network node reconfiguring and/or retraining the beam prediction model. Further, this may conserve processing resources that would have otherwise been used by the network node to process and/or analyze predicted beam measurements for beams that are unavailable and/or may be otherwise not selected by the network node.

Figure 7:
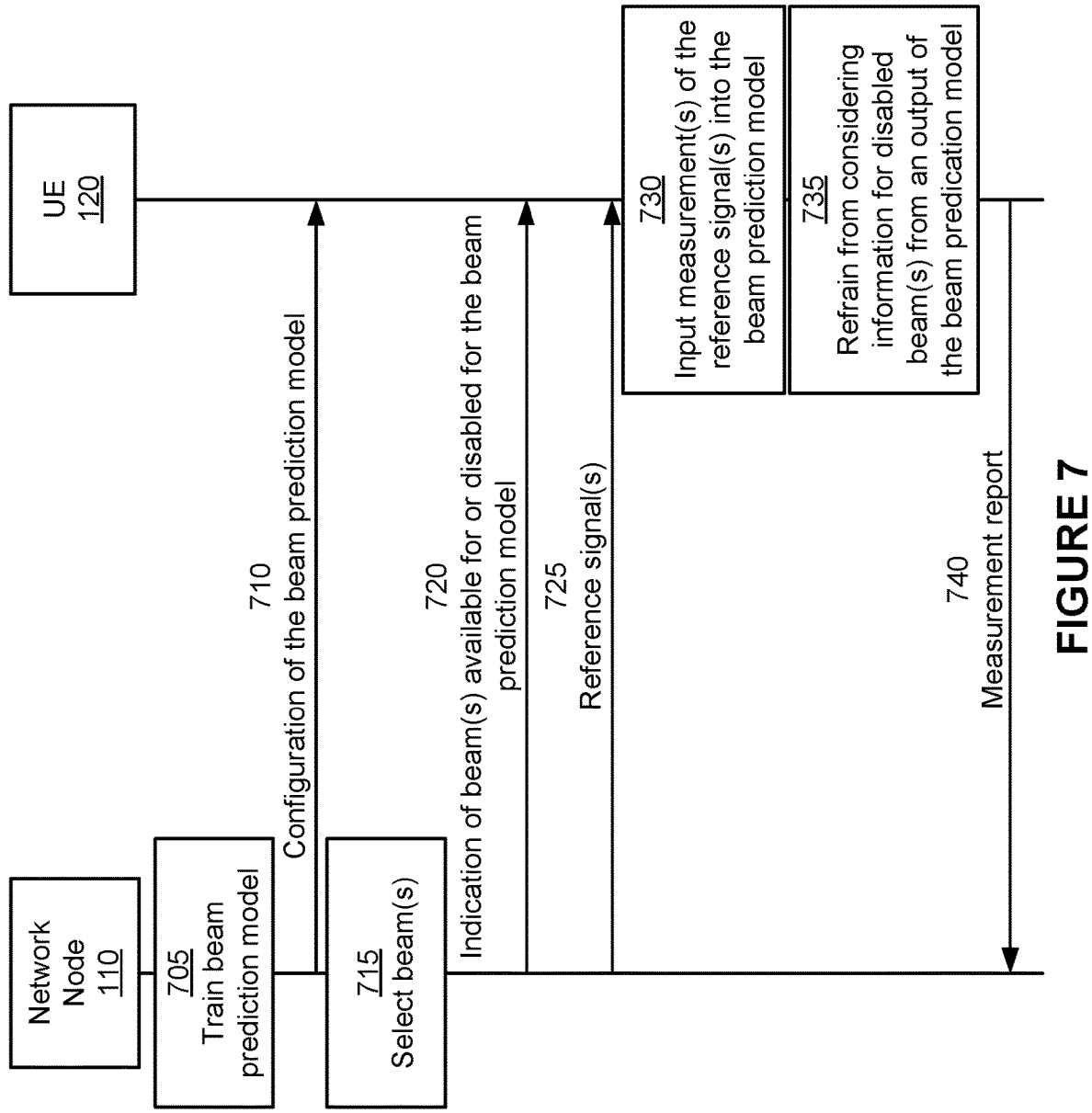
FIG. 7 is a diagram of an example associated with disabling beam prediction outputs, in accordance with the present disclosure.

FIG. 7 is a diagram of an example associated with disabling beam prediction outputs, in accordance with the present disclosure. As shown in FIG. 7, a network node 110

(for example, a base station, a CU, a DU, and/or an RU) may communicate with a UE 120. In some aspects, the network node 110 and the UE 120 may be part of a wireless network (for example, the wireless network 100). The UE 120 and the network node 110 may have established a wireless connection prior to operations shown in FIG. 7.

In some aspects, actions described herein as being performed by the network node 110 may be performed by multiple different network nodes. For example, configuration actions may be performed by a first network node (for example, a CU or a DU), and radio communication actions may be performed by a second network node (for example, a DU or an RU). As used herein, the network node 110 "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU.

In a first operation 705, the network node 110 may train and/or configure a beam prediction model. For example, the network node 110 may identify or select a model structure for a neural network function associated with the beam prediction model. Additionally, the network node 110 may train or select one or more coefficients or weights for a parameter set associated with the neural network function. For example, the network node 110 may train the beam prediction model to be configured to output predicted measurement values for a set of beams (for example, a set of beams associated with the network node) based at least in part on an input of beam measurements associated with one or more beams (for example, the set of beams or a different one or more beams).

In some aspects the set of beams may be associated with different network nodes. For example, a first one or more beams, from the set of beams, may be associated with a first network node (for example, a first repeater, relay station, TRP, and/or reconfigurable intelligent surface (RIS) associated with the network node 110) and a second one or more beams, from the set of beams, may be associated with a second network node (for example, a second repeater, relay station, TRP, and/or RIS associated with the network node 110). In some aspects, the network node 110 may transmit, and the UE 120 may receive, an indication of an associated or mapping between beams included in the set of beams and respective network nodes associated with the beams. In other aspects, the UE 120 may not receive an indication of (for example, may be unaware of) the association or mapping between the beams included in the set of beams and respective network nodes.

In a second operation 710, the network node 110 may transmit, and the UE 120 may receive, a configuration of the beam prediction model that is trained to predict beam measurements for the set of beams. In some aspects, the UE may receive the configuration via one or more of RRC signaling, one or more MAC-CEs, and/or DCI, among other examples. In some aspects, the configuration may include an indication of one or more configuration parameters (for example, stored by the UE 120 and/or previously indicated by the network node 110 or other network device) for selection by the UE 120, and/or explicit configuration information for the UE 120 to use to configure itself, among other examples.

In some aspects, the configuration of the beam prediction model may indicate a model structure and/or a parameter set associated with the beam prediction model. In some aspects, the configuration may indicate a set of input beams (for example, beams to be measured to obtain measurement values to be input to the beam prediction model). Additionally, the configuration information may indicate a set of output beams (for example, beams for which the beam prediction model is trained to output predicted beam measurements). The input beam(s) and/or the output beam(s) may be associated with respective reference signal identifiers or respective transmission configuration indicator (TCI) states. In other words, the UE 120 may be configured with an AI/ML model for beam prediction (for example, the beam prediction model), where the input and output of ML model correspond to different beams (for example, different TCI states and/or different reference signals). The configuration of the beam prediction model may indicate associations or mappings between inputs and/or outputs of the beam prediction model and respective reference signal identifiers or respective TCI states.

In some aspects, the configuration of the beam prediction model may indicate a subset (for example, one or more) of beams, from the set of beams (the set out output beams), that are available and/or activated for the beam prediction model. Additionally or alternatively, the configuration of the beam prediction model may indicate a subset (for example, one or more) of beams, from the set of beams (the set out output beams), that are unavailable and/or disabled for the beam prediction model. The indication of the available or unavailable beams for the beam prediction model is described in more detail elsewhere herein, such as in connection with a fourth operation 720.

The UE 120 may configure itself with the beam prediction model. For example, the UE 120 may deploy and/or execute the configured beam prediction model. In some aspects, the UE may be configured to perform one or more operations described herein based at least in part on the configuration of the beam prediction model.

In a third operation 715, the network node 110 may select a subset (for example, one or more) of beams, from the set of beams (for example, the set of beams for which the beam prediction model is trained to predict measurement values), that are available and/or activated for the beam prediction model. Additionally or alternatively, the network node 110 may select a subset (for example, one or more) of beams, from the set of beams (for example, the set of beams for which the beam prediction model is trained to predict measurement values), that are unavailable and/or disabled for the beam prediction model. In some aspects, the network node 110 may select one or more beams to not be reported by the UE 120 (for predicted beam measurements) and/or may select one or more beams to be reported by the UE 120 (for predicted beam measurements). As used herein, a beam being "active" or "available" for the beam prediction model may refer to an output of the beam prediction model that is associated with the beam being available for consideration by the UE 120. A beam being "disabled" or "unavailable" for the beam prediction model may indicate that an output of the beam prediction model that is associated with the beam is to be ignored or not considered by the UE 120.

In some aspects, the network node 110 may select the subset of beams that are available or disabled for the beam prediction model based at least in part on a network load or a quantity of UEs associated with a given beam. For example, if a quantity of UEs currently using a given beam for communications with the network node 110 (or with another network node) satisfies a load threshold, then the network node 110 may determine that the given beam is to be unavailable (for example, because there is a high network load associated with the beam). If the quantity of UEs currently using a given beam for communications with the network node 110 (or with another network node) does not satisfy the load threshold, then the network node 110 may determine that the given beam is to be available. As another example, the network node 110 may select the subset of beams that are available or disabled for the beam prediction model based at least in part on an operational status of a network node associated with a given beam. For example, one or more beams may be associated with a network node (for example, a repeater or relay station) that is operating in an energy saving mode and/or is operating in a sleep mode. If the network node 110 determines that a network node is operating in an energy saving mode, a sleep mode, and/or another operating mode in which the network node is not currently fully operational, then the network node 110 may determine that beam(s) associated with the network node are to be unavailable or disabled for the beam prediction model.

As another example, the network node 110 may select the subset of beams that are available or disabled for the beam prediction model based at least in part on a prediction accuracy associated with the subset of beams. For example, one or more beams may be associated with a poor prediction accuracy. For example, a training set associated with the beam prediction model may not include sufficient data points associated with the one or more beams to train the beam prediction model to accurately predict measurement values associated with the beam prediction model. The network node 110 may determine the prediction accuracy based at least in part on comparing a predicted beam measurement for a beam to an actual beam measurement of the beam. The network node 110 may determine that if a prediction accuracy for a given beam does not satisfy an accuracy threshold, then the given beam is to be disabled for the beam prediction model. The network node 110 may select the subset of beams that are available or disabled for the beam prediction model using other factors, such as identified beam blockages, a power state of the network node 110, and/or previous measured or predicted measurements of a beam (for example, if a beam is associated with a measurement that does not satisfy a threshold, then the network node 110 may determine that the beam is to be disabled), among other examples.

In the fourth operation 720, the network node 110 may transmit, and the UE 120 may receive, an indication of a subset of beams, from the set of beams (for example, the set of beams for which the beam prediction model is trained to predict measurement values), that are to be associated with a measurement report. For example, in some aspects, the network node 110 may indicate beams that are to be included in, or considered from, an output of the beam prediction model. In such examples, the UE 120 may determine the beams that are to be disabled for the beam prediction report (for example, to be ignored or not considered in the output of the beam prediction model) by identifying beams, from the set of beams, that are not included in the subset of beams. In some other aspects, the network node 110 may indicate one or more (for example, a subset of) beams that are to be disabled for the beam prediction model. In other words, the indication of the subset of beams, from the set of beams, that are to be associated with a measurement report may include an explicit indication of beams to be considered by the UE 120 from the output of the beam prediction model and/or an explicit indication of beams that are to be disabled (for example, ignored or not considered) from the output of the beam prediction model.

In some aspects, the indication of the subset of beams, from the set of beams, that are to be associated with a measurement report may be included in an RRC communication. In some aspects, the subset of beams may be dynamically changed by the network node 110 over time. For example, an initial subset of beams that are to be associated with a measurement report (for example, that are activated or available for the beam prediction model) may be indicated in an RRC communication. The network node 110 may transmit, and the UE 120 may receive, another indication of a different subset of beams, from the set of beams, that are to be associated with another measurement report. In other words, the network node 110 may update the subset of beams over time. In some aspects, the update (for example, the indication of the different subset of beams) may be included in a MAC-CE communication or a DCI communication.

In some aspects, the indication of the subset of beams, from the set of beams, that are to be associated with a measurement report may be based at least in part on active reference signals. For example, the UE 120 may receive an association between the set of beams and respective reference signal identifiers (or reference signal set identifiers). The UE 120 may receive, from the network node (for example, in the fourth operation 720), an indication of one or more active reference signals from a set of configured reference signals. The indication of the subset of beams may be based at least in part on the subset of beams being associated with reference signals, from the set of configured reference signals, that are included in the one or more active reference signals. In other words, if a reference signal identifier associated with a beam, from the set of beams, is activated for the UE 120, then the UE 120 may determine that the beam is active or available for the beam prediction model. If a reference signal identifier associated with a beam, from the set of beams, is not activated for the UE 120, then the UE 120 may determine that the beam is disabled or unavailable for the beam prediction model. In other words, when an output of the beam prediction model is not associated with an active reference signal identifier, then the output of the beam prediction model may be ignored by the UE 120 for reporting.

In some aspects, the indication of the subset of beams, from the set of beams, that are to be associated with a measurement report may be based at least in part on an explicit indication from the network node 110 to the UE 120. For example, the UE 120 may receive a respective indication, for each beam included in the set of beams, indicating whether the beam is disabled or available for the beam prediction model. In some aspects, the indications for each beam included in the set of beams may be included in a bitmap. For example, the UE 120 may receive a bitmap, associated with the set of beams, including indications for respective beams from the set of beams (for example, where a "0" bit in the bitmap indicates that a beam associated with the bit is disabled and a "1" bit in the bitmap indicates that a beam associated with the bit is available).

In some aspects, the indication of the subset of beams, from the set of beams, that are to be associated with a measurement report may be included in the configuration of the beam prediction model (for example, received by the UE 120 in the second operation 710). For example, the configuration of the beam prediction model may include an indication of beams that are available or that are disabled for the output of the beam prediction model. In other aspects, the indication of the subset of beams, from the set of beams, that are to be associated with a measurement report may be included in a configuration of the measurement report. For example, the UE 120 may receive a measurement report configuration associated with the measurement report. The measurement report configuration may include the indication of the subset of beams.

In some aspects, the UE 120 may receive an indication of an association between one or more candidate network nodes and respective beams included in the set of beams. For example, as described above, the set of beams may be associated with different network nodes. For example, a first one or more beams, from the set of beams, may be associated with a first network node (for example, a first repeater, relay station, TRP, and/or RIS associated with the network node 110) and a second one or more beams, from the set of beams, may be associated with a second network node (for example, a second repeater, relay station, TRP, and/or RIS associated with the network node 110). The UE 120 may receive an association or mapping between beams included in the set of beams and respective candidate network nodes. The UE 120 may receive an indication that a candidate network node, from the one or more candidate network nodes, is available. In such examples, the UE 120 may determine that beam(s) associated with the candidate network node are available for the beam prediction model. As another example, the UE 120 may receive an indication that a candidate network node, from the one or more candidate network nodes, is unavailable. In such examples, the UE 120 may determine that beam(s) associated with the candidate network node are disabled for the beam prediction model.

In some examples, the UE 120 may receive an indication of one or more groups of beams from the set of beams. For example, the network node 110 may group beams together, in a single group, that are associated with a given candidate network node. In other examples, the network node 110 may group beams together using other factors, such as a spatial direction associated with the beams. A group of beams may include one or more beams. The UE 120 may receive, from the network node 110 (for example, in the fourth operation 720), an indication of at least one group, from the one or more groups, that is disabled for the beam prediction model. The UE 120 may determine that beams included in the at least one group are disabled. In some other aspects, the UE 120 may receive an indication of at least one group, from the one or more groups, that is available or active for the beam prediction model. The UE 120 may determine that beams included in the at least one group are available.

In some aspects, the UE 120 may receive an indication of a time domain availability pattern associated with the set of beams. For example, the time domain availability pattern may indicate a periodicity and/or a time pattern for an availability of one or more beams included in the set of beams. For example, the periodicity and/or time pattern may be based at least in part on a duty cycle of a candidate network node associated with a given beam. For example, for a given beam (or a group of beams), a time domain availability pattern may indicate that the given beam (or group of beams) is available for X milliseconds, symbols, or slots every Y milliseconds, symbols, or slots, among other examples. The UE 120 may determine that the subset of beams is available or disabled for the beam prediction model at a current time based on the time domain availability pattern (for example, in addition to other indications described elsewhere herein).

In a fifth operation 725, the network node 110 may transmit, and the UE 120 may receive, one or more reference signals. For example, the reference signals may be SSBs, CSI-RSs, or another type of reference signal. The reference signals may be associated with an input of the beam prediction model. The UE 120 may perform measurements of the signals that are associated with the reference signals. For example, the UE 120 may perform L1 RSRP measurements and/or L1 signal-to-interference-plus-noise ratio (SINR) measurements, among other examples, of the signals that are associated with the reference signals. For example, the UE 120 may measure the one or more reference signals to obtain a set of measurement values.

In a sixth operation 730, the UE 120 may input measurement value(s) of the one or more reference signals into the beam prediction model. The UE 120 may obtain an output of the beam prediction model based at least in part inputting the measurement value(s) of the one or more reference signals. The output of the beam prediction model may include beam predictions associated with the set of beams. In other words, the beam prediction model may output predictions for each beam for which the beam prediction model is trained and/or configured. In a seventh operation 735, the UE 120 may refrain from including, in the measurement report, one or more beam predictions, from the output, that are not included in the subset of beams. In other words, the UE 120 may identify one or more beams, from the set of beams, that are disabled for the beam prediction model (for example, based at least in part on the indication received in the fourth operation 720). The UE 120 may refrain from (for example, may ignore or may not consider) outputs of the beam prediction model that are associated with the one or more beams that are disabled for the beam prediction model. For example, the UE 120 may determine information (for example, beam identifiers and/or predicted beam measurements) that are to be reported in a measurement report from the output of the beam prediction model while ignoring or not considering information associated with the one or more beams in the output.

In an eighth operation 740, the UE 120 may transmit, and the network node 110 may receive, a measurement report. The measurement report may indicate one or more predicted beam measurements that are based at least in part on the output of the beam prediction model. For example, the one or more predicted beam measurements may be based at least in part on information associated with the subset of beams that are to be associated with a measurement report (for example, based at least in part on the indication received in the fourth operation 720). In other words, if a predicted beam measurement associated with a beam that is disabled is a highest predicted beam measurement indicated by the output of the beam prediction model, the UE 120 may not report an indication of the beam and/or the predicted beam measurement. Rather, the UE 120 may report (for example, in the measurement report) a next one or more highest predicted beam measurements for beams that are available or active for the beam prediction model.

As a result, the network node 110 and the UE 120 may be enabled to disable one or more beams associated with the output of a trained beam prediction model. This may conserve processing resources and/or network resources that would have otherwise been used to reconfigure or retrain the beam prediction model and transmit a configuration of the reconfigured or the retrained beam prediction model to the UE 120. Additionally, this may reduce a latency or delay associated with the UE 120 providing predicted beam measurements that would have otherwise been introduced associated with the network node 110 reconfiguring and/or retraining the beam prediction model. Further, this may conserve processing resources that would have otherwise been used by the network node 110 to process and/or analyze predicted beam measurements for beams that are unavailable and/or may be otherwise not selected by the network node 110.

Figure 8:
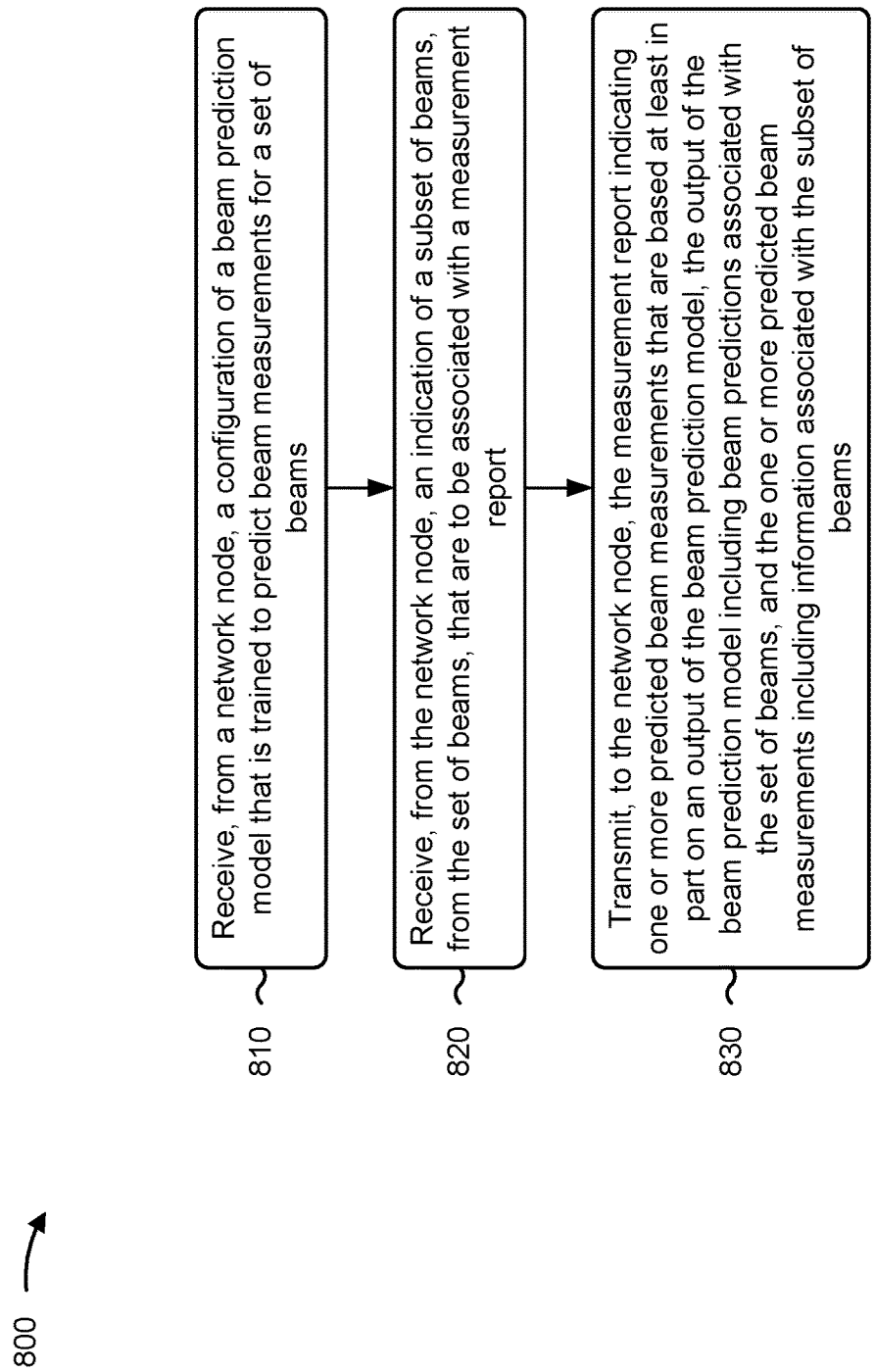
FIG. 8 is a flowchart illustrating an example process performed, for example, by a UE that supports disabling beam prediction outputs in accordance with the present disclosure.

FIG. 8 is a flowchart illustrating an example process 800 performed, for example, by a UE that supports disabling beam prediction outputs in accordance with the present disclosure. Example process 800 is an example where the UE (for example, the UE 120) performs operations associated with disabling beam prediction outputs.

As shown in FIG. 8, in some aspects, process 800 may include receiving, from a network node, a configuration of a beam prediction model that is trained to predict beam measurements for a set of beams (block 810). For example, the UE (such as by using communication manager 140 or reception component 1002, depicted in FIG. 10) may receive, from a network node, a configuration of a beam prediction model that is trained to predict beam measurements for a set of beams, as described above.

As further shown in FIG. 8, in some aspects, process 800 may include receiving, from the network node, an indication of a subset of beams, from the set of beams, that are to be associated with a measurement report (block 820). For example, the UE (such as by using communication manager 140 or reception component 1002, depicted in FIG. 10) may receive, from the network node, an indication of a subset of beams, from the set of beams, that are to be associated with a measurement report, as described above.

As further shown in FIG. 8, in some aspects, process 800 may include transmitting, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams (block 830). For example, the UE (such as by using communication manager 140 or transmission component 1004, depicted in FIG. 10) may transmit, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams, as described above.

Process 800 may include additional aspects, such as any single aspect or any combination of aspects described below or in connection with one or more other processes described elsewhere herein.

In a first additional aspect, the set of beams are associated with respective reference signal identifiers or respective TCI states.

In a second additional aspect, alone or in combination with the first aspect, process 800 includes obtaining, from the beam prediction model, the output of the beam prediction model including the beam predictions associated with the set of beams, and refraining from including, in the measurement report, one or more beam predictions, from the output, that are not included in the subset of beams.

In a third additional aspect, alone or in combination with one or more of the first and second aspects, the indication of the subset of beams is included in a radio resource control communication, and process 800 includes receiving another indication of a different subset of beams, from the set of beams, that are to be associated with another measurement report.

In a fourth additional aspect, alone or in combination with one or more of the first through third aspects, the other indication of the different subset of beams is included in a MAC control element communication or in a downlink control information communication.

In a fifth additional aspect, alone or in combination with one or more of the first through fourth aspects, process 800 includes receiving an indication of one or more active reference signals from a set of configured reference signals, where the indication of the subset of beams is based at least in part on the subset of beams being associated with reference signals, from the set of configured reference signals, that are included in the one or more active reference signals.

In a sixth additional aspect, alone or in combination with one or more of the first through fifth aspects, receiving the indication of the subset of beams includes receiving a respective indication, for each beam included in the set of beams, indicating whether the beam is disabled for the beam prediction model.

In a seventh additional aspect, alone or in combination with one or more of the first through sixth aspects, the indication of the subset of beams is included in the configuration of the beam prediction model.

In an eighth additional aspect, alone or in combination with one or more of the first through seventh aspects, process 800 includes receiving a measurement report configuration associated with the measurement report, the measurement report configuration including the indication of the subset of beams.

In a ninth additional aspect, alone or in combination with one or more of the first through eighth aspects, receiving the indication of the subset of beams includes receiving a bitmap, associated with the set of beams, including indications for respective beams from the set of beams.

In a tenth additional aspect, alone or in combination with one or more of the first through ninth aspects, process 800 includes receiving an indication of an association between one or more candidate network nodes and respective beams included in the set of beams, and receiving the indication of the subset of beams includes receiving an indication that a candidate network node, from the one or more candidate network nodes, is available, where the candidate network node is associated with the subset of beams.

In an eleventh additional aspect, alone or in combination with one or more of the first through tenth aspects, process 800 includes receiving an indication of one or more groups of beams from the set of beams, and receiving the indication of the subset of beams includes receiving an indication of a group, from the one or more groups, that is disabled for the beam prediction model, the group not including the subset of beams.

In a twelfth additional aspect, alone or in combination with one or more of the first through eleventh aspects, process 800 includes receiving an indication of a time domain availability pattern associated with the set of beams, where the indication of the subset of beams is based at least in part on the time domain availability pattern indicating that the subset of beams is available or disabled for the beam prediction model at a current time.

In a thirteenth additional aspect, alone or in combination with one or more of the first through twelfth aspects, the indication of the subset of beams that are to be associated with the measurement report includes an indication of one or more beams that are to be disabled for the beam prediction model.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
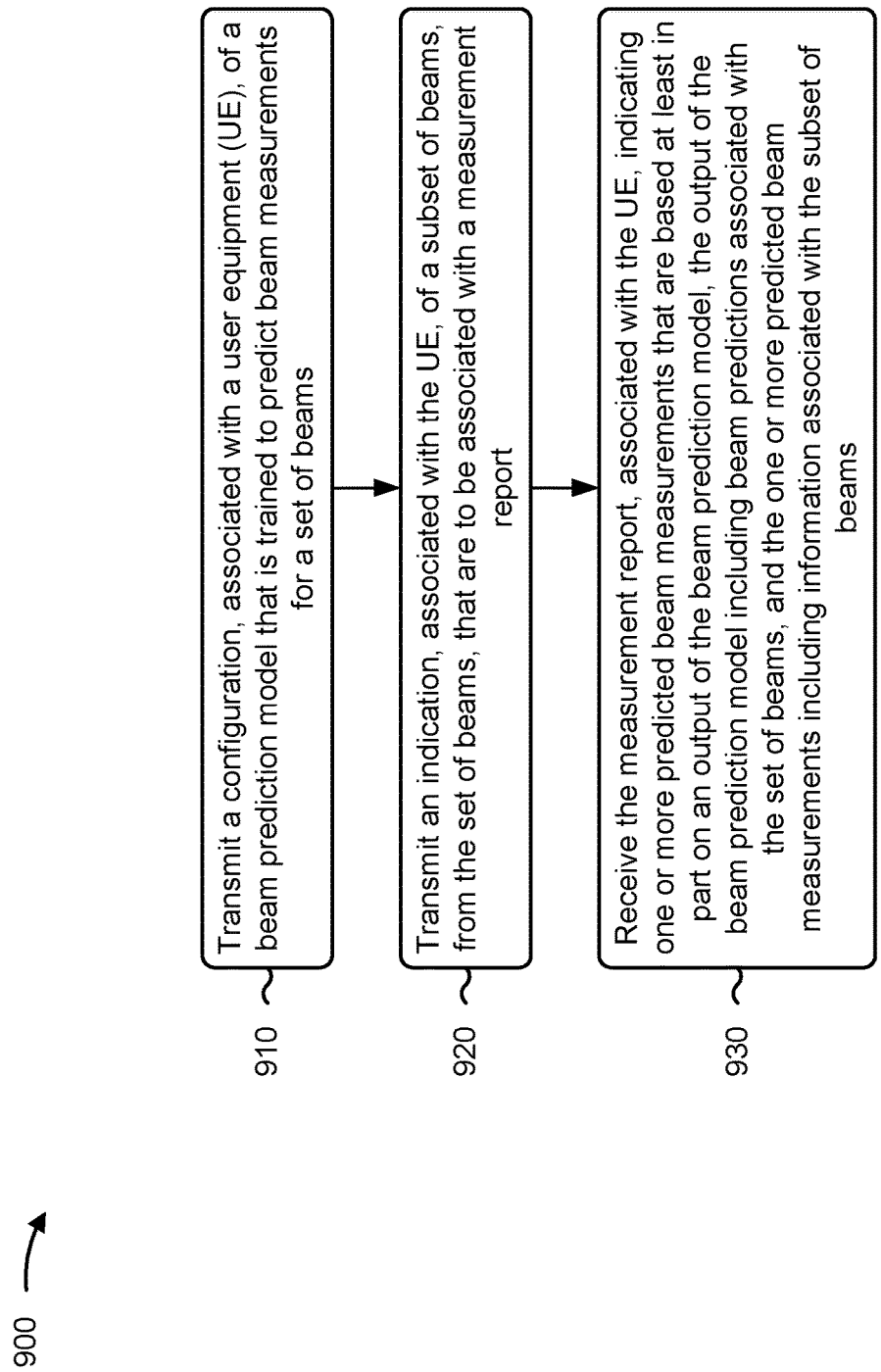
FIG. 9 is a flowchart illustrating an example process performed, for example, by a network node that supports disabling beam prediction outputs in accordance with the present disclosure.

FIG. 9 is a flowchart illustrating an example process 900 performed, for example, by a network node that supports disabling beam prediction outputs in accordance with the present disclosure. Example process 900 is an example where the network node (for example, the network node 110) performs operations associated with disabling beam prediction outputs.

As shown in FIG. 9, in some aspects, process 900 may include transmitting a configuration, associated with a UE, of a beam prediction model that is trained to predict beam measurements for a set of beams (block 910). For example, the network node (such as by using communication manager 150 or transmission component 1104, depicted in FIG. 11) may transmit a configuration, associated with a UE, of a beam prediction model that is trained to predict beam measurements for a set of beams, as described above.

As further shown in FIG. 9, in some aspects, process 900 may include transmitting an indication, associated with the UE, of a subset of beams, from the set of beams, that are to be associated with a measurement report (block 920). For example, the network node (such as by using communication manager 150 or transmission component 1104, depicted in FIG. 11) may transmit an indication, associated with the UE, of a subset of beams, from the set of beams, that are to be associated with a measurement report, as described above.

As further shown in FIG. 9, in some aspects, process 900 may include receiving the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams (block 930). For example, the network node (such as by using communication manager 150 or reception component 1102, depicted in FIG. 11) may receive the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams, as described above.

Process 900 may include additional aspects, such as any single aspect or any combination of aspects described below or in connection with one or more other processes described elsewhere herein.

In a first additional aspect, the set of beams are associated with respective reference signal identifiers or respective TCI states.

In a second additional aspect, alone or in combination with the first aspect, the indication of the subset of beams is included in a radio resource control communication, and process 900 includes transmitting another indication of a different subset of beams, from the set of beams, that are to be associated with another measurement report.

In a third additional aspect, alone or in combination with one or more of the first and second aspects, the other indication of the different subset of beams is included in a MAC control element communication or in a downlink control information communication.

In a fourth additional aspect, alone or in combination with one or more of the first through third aspects, process 900 includes transmitting an indication of one or more active reference signals from a set of configured reference signals, where the indication of the subset of beams is based at least in part on the subset of beams being associated with reference signals, from the set of configured reference signals, that are included in the one or more active reference signals.

In a fifth additional aspect, alone or in combination with one or more of the first through fourth aspects, transmitting the indication of the subset of beams includes transmitting a respective indication, for each beam included in the set of beams, indicating whether the beam is disabled or active for the beam prediction model.

In a sixth additional aspect, alone or in combination with one or more of the first through fifth aspects, the indication of the subset of beams is included in the configuration of the beam prediction model.

In a seventh additional aspect, alone or in combination with one or more of the first through sixth aspects, process 900 includes transmitting a measurement report configuration associated with the measurement report, the measurement report configuration including the indication of the subset of beams.

In an eighth additional aspect, alone or in combination with one or more of the first through seventh aspects, transmitting the indication of the subset of beams includes transmitting a bitmap, associated with the set of beams, including indications for respective beams from the set of beams.

In a ninth additional aspect, alone or in combination with one or more of the first through eighth aspects, process 900 includes transmitting an indication of an association between one or more candidate network nodes and respective beams included in the set of beams, and transmitting the indication of the subset of beams includes transmitting an indication that a candidate network node, from the one or more candidate network nodes, is available, where the candidate network node is associated with the subset of beams.

In a tenth additional aspect, alone or in combination with one or more of the first through ninth aspects, process 900 includes transmitting an indication of one or more groups of beams from the set of beams, and transmitting the indication of the subset of beams includes transmitting an indication of a group, from the one or more groups, that is disabled for the beam prediction model, the group not including the subset of beams.

In an eleventh additional aspect, alone or in combination with one or more of the first through tenth aspects, process 900 includes transmitting an indication of a time domain availability pattern associated with the set of beams, where the indication of the subset of beams is based at least in part on the time domain availability pattern indicating that the subset of beams is disabled or active for the beam prediction model at a current time.

In a twelfth additional aspect, alone or in combination with one or more of the first through eleventh aspects, the indication of the subset of beams that are to be associated with the measurement report includes an indication of one or more beams that are to be disabled for the beam prediction model.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
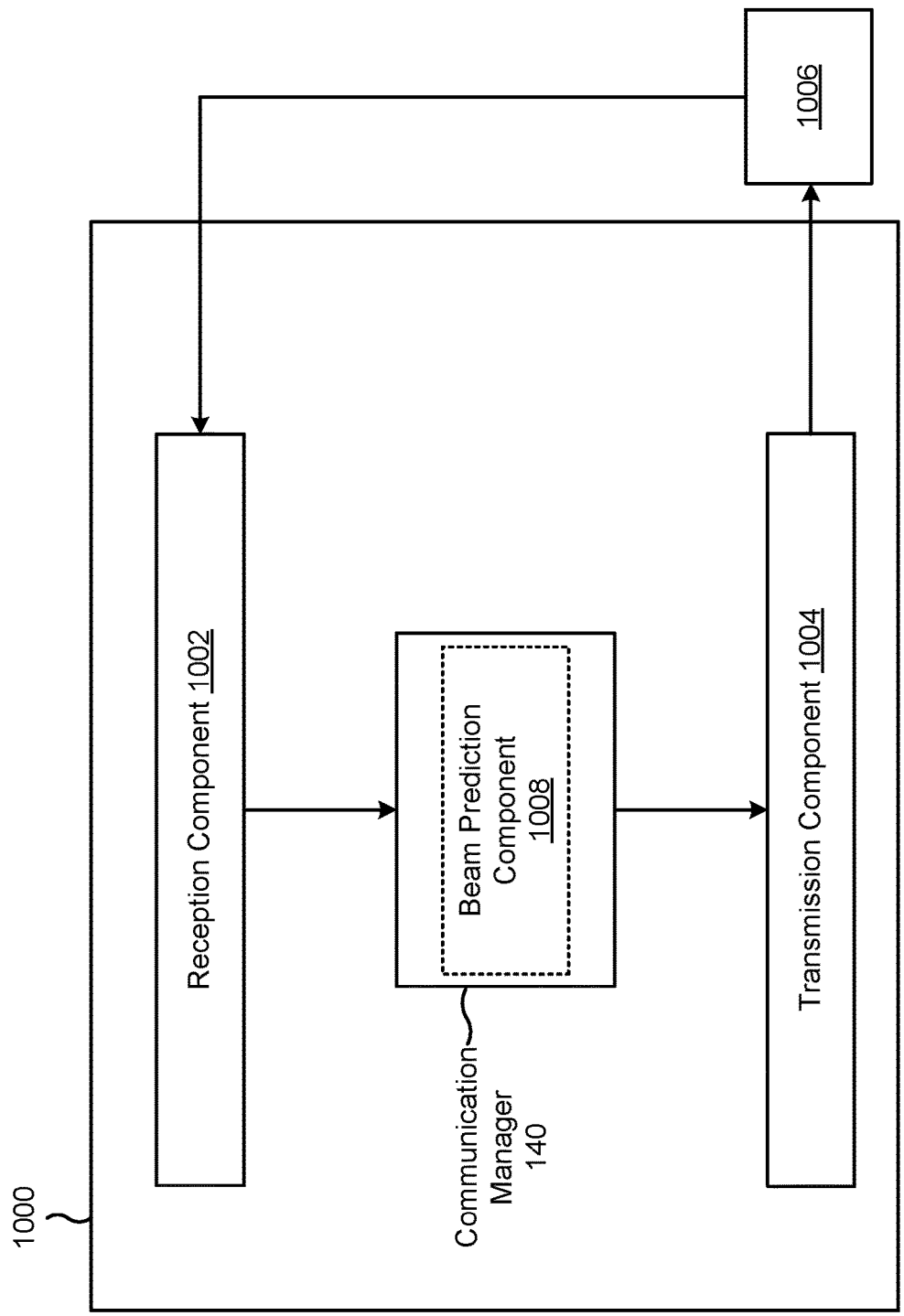
FIG. 10 is a diagram of an example apparatus for wireless communication that supports disabling beam prediction outputs in accordance with the present disclosure.

FIG. 10 is a diagram of an example apparatus 1000 for wireless communication that supports disabling beam prediction outputs in accordance with the present disclosure. The apparatus 1000 may be a UE, or a UE may include the apparatus 1000. In some aspects, the apparatus 1000 includes a reception component 1002, a transmission component 1004, and a communication manager 140, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to perform one or more operations described herein in connection with FIG. 7. Additionally or alternatively, the apparatus 1000 may be configured to perform one or more processes described herein, such as process 800 of FIG. 8. In some aspects, the apparatus 1000 may include one or more components of the UE described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 140. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, and/or a memory of the UE described above in connection with FIG. 2.

The transmission component 1004 may transmit communications, such as reference signals, control information, and/or data communications, to the apparatus 1006. In some aspects, the communication manager 140 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, and/or a memory of the UE described above in connection with FIG. 2. In some aspects, the transmission component 1004 may be co-located with the reception component 1002 in a transceiver.

The communication manager 140 may receive or may cause the reception component 1002 to receive, from a network node, a configuration of a beam prediction model that is trained to predict beam measurements for a set of beams. The communication manager 140 may receive or may cause the reception component 1002 to receive, from the network node, an indication of a subset of beams, from the set of beams, that are to be associated with a measurement report. The communication manager 140 may transmit or may cause the transmission component 1004 to transmit, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams. In some aspects, the communication manager 140 may perform one or more operations described elsewhere herein as being performed by one or more components of the communication manager 140.

The communication manager 140 may include a controller/processor, a memory, of the UE described above in connection with FIG. 2. In some aspects, the communication manager 140 includes a set of components, such as a beam prediction component 1008. Alternatively, the set of components may be separate and distinct from the communication manager 140. In some aspects, one or more components of the set of components may include or may be implemented within a controller/processor, a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a network node, a configuration of a beam prediction model that is trained to predict beam measurements for a set of beams. The reception component 1002 may receive, from the network node, an indication of a subset of beams, from the set of beams, that are to be associated with a measurement report. The transmission component 1004 may transmit, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams.

The beam prediction component 1008 may obtain, from the beam prediction model, the output of the beam prediction model including the beam predictions associated with the set of beams.

The beam prediction component 1008 may refrain from including, in the measurement report, one or more beam predictions, from the output, that are not included in the subset of beams.

The reception component 1002 may receive an indication of one or more active reference signals from a set of configured reference signals wherein the indication of the subset of beams is based at least in part on the subset of beams being associated with reference signals, from the set of configured reference signals, that are included in the one or more active reference signals.

The reception component 1002 may receive a measurement report configuration associated with the measurement report, the measurement report configuration including the indication of the subset of beams.

The reception component 1002 may receive an indication of an association between one or more candidate network nodes and respective beams included in the set of beams wherein receiving the indication of the subset of beams comprises receiving an indication that a candidate network node, from the one or more candidate network nodes, is available, wherein the candidate network node is associated with the subset of beams.

The reception component 1002 may receive an indication of one or more groups of beams from the set of beams wherein receiving the indication of the subset of beams comprises receiving an indication of a group, from the one or more groups, that is disabled for the beam prediction model, the group not including the subset of beams.

The reception component 1002 may receive an indication of a time domain availability pattern associated with the set of beams wherein the indication of the subset of beams is based at least in part on the time domain availability pattern indicating that the subset of beams is available or disabled for the beam prediction model at a current time.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
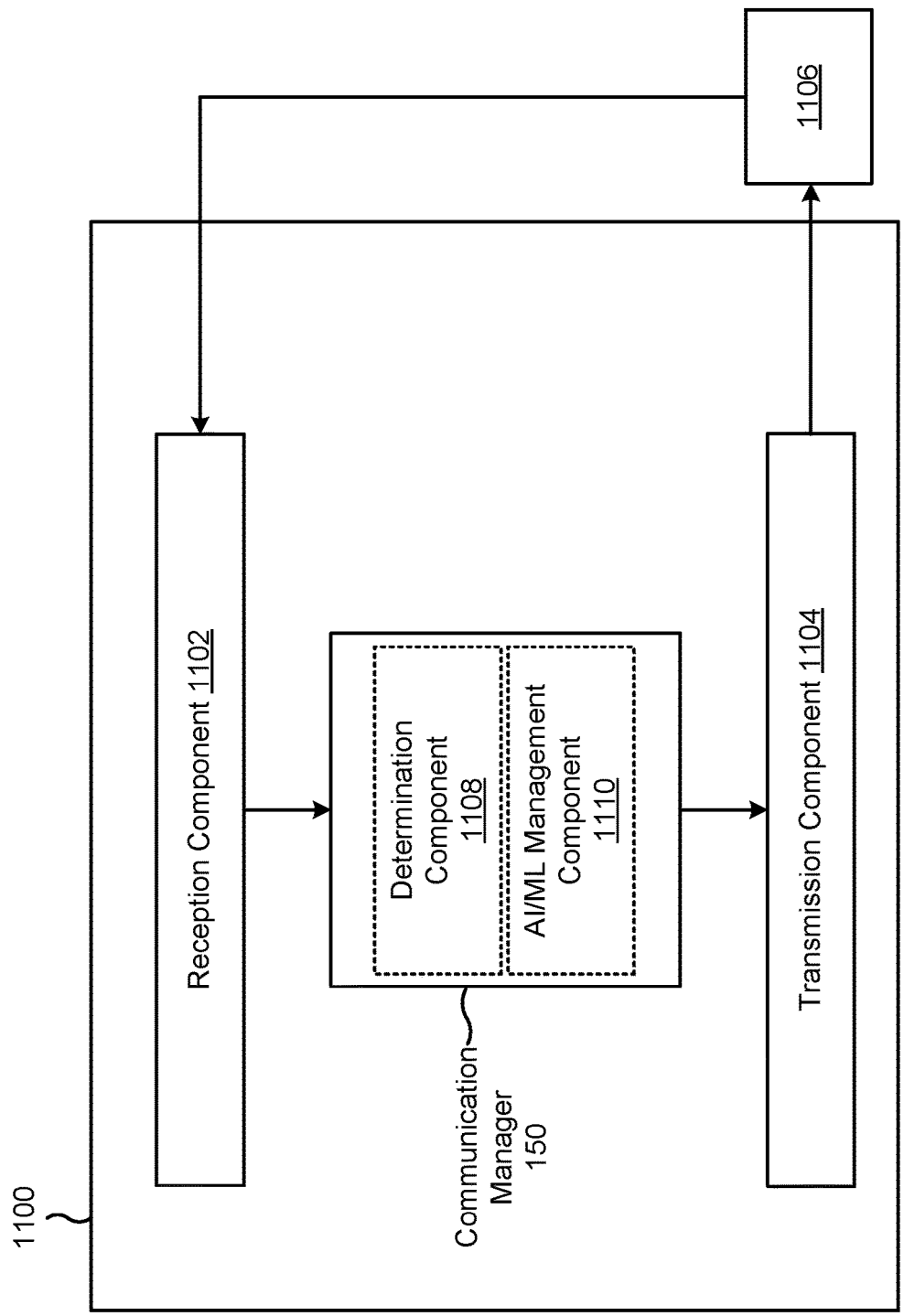
FIG. 11 is a diagram of an example apparatus for wireless communication that supports disabling beam prediction outputs in accordance with the present disclosure.

FIG. 11 is a diagram of an example apparatus 1100 for wireless communication that supports disabling beam prediction outputs in accordance with the present disclosure. The apparatus 1100 may be a network node, or a network node may include the apparatus 1100. In some aspects, the apparatus 1100 includes a reception component 1102, a transmission component 1104, and a communication manager 150, which may be in communication with one another (for example, via one or more buses). As shown, the apparatus 1100 may communicate with another apparatus 1106 (such as a UE, a network node, or another wireless communication device) using the reception component 1102 and the transmission component 1104.

In some aspects, the apparatus 1100 may be configured to perform one or more operations described herein in connection with FIG. 7. Additionally or alternatively, the apparatus 1100 may be configured to perform one or more processes described herein, such as process 900 of FIG. 9. In some aspects, the apparatus 1100 may include one or more components of the network node described above in connection with FIG. 2.

The reception component 1102 may receive communications, such as reference signals, control information, and/or data communications, from the apparatus 1106. The reception component 1102 may provide received communications to one or more other components of the apparatus 1100, such as the communication manager 150. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, and/or a memory of the network node described above in connection with FIG. 2.

The transmission component 1104 may transmit communications, such as reference signals, control information, and/or data communications, to the apparatus 1106. In some aspects, the communication manager 150 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, and/or a memory of the network node described above in connection with FIG. 2. In some aspects, the transmission component 1104 may be co-located with the reception component 1102 in a transceiver.

The communication manager 150 may transmit or may cause the transmission component 1104 to transmit a configuration, associated with a UE, of a beam prediction model that is trained to predict beam measurements for a set of beams. The communication manager 150 may transmit or may cause the transmission component 1104 to transmit an indication, associated with the UE, of a subset of beams, from the set of beams, that are to be associated with a measurement report. The communication manager 150 may receive or may cause the reception component 1102 to receive the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a determination component 1108, and/or an AI/ML management component 1110. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1104 may transmit a configuration, associated with a UE, of a beam prediction model that is trained to predict beam measurements for a set of beams. The transmission component 1104 may transmit an indication, associated with the UE, of a subset of beams, from the set of beams, that are to be associated with a measurement report. The reception component 1102 may receive the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams.

The determination component 1108 may determine or select the subset of beams from the set of beams. The AI/ML management component 1110 may train or configure the beam prediction model to predict beam measurements for the set of beams.

The transmission component 1104 may transmit an indication of one or more active reference signals from a set of configured reference signals wherein the indication of the subset of beams is based at least in part on the subset of beams being associated with reference signals, from the set of configured reference signals, that are included in the one or more active reference signals.

The transmission component 1104 may transmit a measurement report configuration associated with the measurement report, the measurement report configuration including the indication of the subset of beams.

The transmission component 1104 may transmit an indication of an association between one or more candidate network nodes and respective beams included in the set of beams wherein transmitting the indication of the subset of beams comprises transmitting an indication that a candidate network node, from the one or more candidate network nodes, is available, wherein the candidate network node is associated with the subset of beams.

The transmission component 1104 may transmit an indication of one or more groups of beams from the set of beams wherein transmitting the indication of the subset of beams comprises transmitting an indication of a group, from the one or more groups, that is disabled for the beam prediction model, the group not including the subset of beams.

The transmission component 1104 may transmit an indication of a time domain availability pattern associated with the set of beams wherein the indication of the subset of beams is based at least in part on the time domain availability pattern indicating that the subset of beams is disabled or active for the beam prediction model at a current time.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network node, a configuration of a beam prediction model that is trained to predict beam measurements for a set of beams; receiving, from the network node, an indication of a subset of beams, from the set of beams, that are to be associated with a measurement report; and transmitting, to the network node, the measurement report indicating one or more predicted beam measurements that are based at least in part on an output of the beam prediction model, the output of the beam prediction model including beam predictions associated with the set of beams, and the one or more predicted beam measurements including information associated with the subset of beams.

Aspect 2: The method of Aspect 1, wherein the set of beams are associated with respective reference signal identifiers or respective transmission configuration indicator (TCI) states.

Aspect 3: The method of any of Aspects 1-2, further comprising: obtaining, from the beam prediction model, the output of the beam prediction model including the beam predictions associated with the set of beams; and refraining from including, in the measurement report, one or more beam predictions, from the output, that are not included in the subset of beams.

Aspect 4: The method of any of Aspects 1-3, wherein the indication of the subset of beams is included in a radio resource control communication, the method further comprising receiving another indication of a different subset of beams, from the set of beams, that are to be associated with another measurement report.

Aspect 5: The method of Aspect 4, wherein the other indication of the different subset of beams is included in a medium access control (MAC) control element communication or in a downlink control information communication.

Aspect 6: The method of any of Aspects 1-5, further comprising: receiving an indication of one or more active reference signals from a set of configured reference signals, wherein the indication of the subset of beams is based at least in part on the subset of beams being associated with reference signals, from the set of configured reference signals, that are included in the one or more active reference signals.

Aspect 7: The method of any of Aspects 1-6, wherein receiving the indication of the subset of beams comprises receiving a respective indication, for each beam included in the set of beams, indicating whether the beam is disabled for the beam prediction model.

Aspect 8: The method of any of Aspects 1-7, wherein the indication of the subset of beams is included in the configuration of the beam prediction model.

Aspect 9: The method of any of Aspects 1-8, further comprising receiving a measurement report configuration associated with the measurement report, the measurement report configuration including the indication of the subset of beams.

Aspect 10: The method of any of Aspects 1-9, wherein receiving the indication of the subset of beams comprises receiving a bitmap, associated with the set of beams, including indications for respective beams from the set of beams.

Aspect 11: The method of any of Aspects 1-10, further comprising receiving an indication of an association between one or more candidate network nodes and respective beams included in the set of beams, wherein receiving the indication of the subset of beams comprises receiving an indication that a candidate network node, from the one or more candidate network nodes, is available, wherein the candidate network node is associated with the subset of beams.

Aspect 12: The method of any of Aspects 1-11, further comprising receiving an indication of one or more groups of beams from the set of beams, wherein receiving the indication of the subset of beams comprises receiving an indication of a group, from the one or more groups, that is disabled for the beam prediction model, the group not including the subset of beams.

Aspect 13: The method of any of Aspects 1-12, further comprising receiving an indication of a time domain availability pattern associated with the set of beams, wherein the indication of the subset of beams is based at least in part on the time domain availability pattern indicating that the subset of beams is available or disabled for the beam prediction model at a current time.

Aspect 14: The method of any of Aspects 1-13, wherein the indication of the subset of beams that are to be associated with the measurement report includes an indication of one or more beams that are to be disabled for the beam prediction model.

Aspect 15: A method of wireless communication performed by a network node, comprising: transmitting a configuration, associated with a user equipment (UE), of a beam prediction model that is trained to predict beam measurements for a set of beams; transmitting an indication, associated with the UE, of a subset of beams, from the set of beams, that are to be associated with a measurement report; and receiving the measurement report, associated with the UE, indicating one or more predicted beam measurements that are based at least in part on an output of the beam prediction model, the output of the beam prediction model including beam predictions associated with the set of beams, and the one or more predicted beam measurements including information associated with the subset of beams.

Aspect 16: The method of Aspect 15, wherein the set of beams are associated with respective reference signal identifiers or respective transmission configuration indicator (TCI) states.

Aspect 17: The method of any of Aspects 15-16, wherein the indication of the subset of beams is included in a radio resource control communication, the method further comprising transmitting another indication of a different subset of beams, from the set of beams, that are to be associated with another measurement report.

Aspect 18: The method of Aspect 17, wherein the other indication of the different subset of beams is included in a medium access control (MAC) control element communication or in a downlink control information communication.

Aspect 19: The method of any of Aspects 15-18, further comprising: transmitting an indication of one or more active reference signals from a set of configured reference signals, wherein the indication of the subset of beams is based at least in part on the subset of beams being associated with reference signals, from the set of configured reference signals, that are included in the one or more active reference signals.

Aspect 20: The method of any of Aspects 15-19, wherein transmitting the indication of the subset of beams comprises transmitting a respective indication, for each beam included in the set of beams, indicating whether the beam is disabled or active for the beam prediction model.

Aspect 21: The method of any of Aspects 15-20, wherein the indication of the subset of beams is included in the configuration of the beam prediction model.

Aspect 22: The method of any of Aspects 15-21, further comprising transmitting a measurement report configuration associated with the measurement report, the measurement report configuration including the indication of the subset of beams.

Aspect 23: The method of any of Aspects 15-22, wherein transmitting the indication of the subset of beams comprises transmitting a bitmap, associated with the set of beams, including indications for respective beams from the set of beams.

Aspect 24: The method of any of Aspects 15-23, further comprising transmitting an indication of an association between one or more candidate network nodes and respective beams included in the set of beams, wherein transmitting the indication of the subset of beams comprises transmitting an indication that a candidate network node, from the one or more candidate network nodes, is available, wherein the candidate network node is associated with the subset of beams.

Aspect 25: The method of any of Aspects 15-24, further comprising transmitting an indication of one or more groups of beams from the set of beams, wherein transmitting the indication of the subset of beams comprises transmitting an indication of a group, from the one or more groups, that is disabled for the beam prediction model, the group not including the subset of beams.

Aspect 26: The method of any of Aspects 15-25, further comprising transmitting an indication of a time domain availability pattern associated with the set of beams, wherein the indication of the subset of beams is based at least in part on the time domain availability pattern indicating that the subset of beams is disabled or active for the beam prediction model at a current time.

Aspect 27: The method of any of Aspects 15-26, wherein the indication of the subset of beams that are to be associated with the measurement report includes an indication of one or more beams that are to be disabled for the beam prediction model.

Aspect 28: An apparatus for wireless communication at a device, comprising a processor; memory coupled with the processor; and instructions stored in the memory and executable by the processor to cause the apparatus to perform the method of one or more of Aspects 1-14.

Aspect 29: A device for wireless communication, comprising a memory and one or more processors coupled to the memory, the one or more processors configured to perform the method of one or more of Aspects 1-14.

Aspect 30: An apparatus for wireless communication, comprising at least one means for performing the method of one or more of Aspects 1-14.

Aspect 31: A non-transitory computer-readable medium storing code for wireless communication, the code comprising instructions executable by a processor to perform the method of one or more of Aspects 1-14.

Aspect 32: A non-transitory computer-readable medium storing a set of instructions for wireless communication, the set of instructions comprising one or more instructions that, when executed by one or more processors of a device, cause the device to perform the method of one or more of Aspects 1-14.

Aspect 33: An apparatus for wireless communication at a device, comprising a processor; memory coupled with the processor; and instructions stored in the memory and executable by the processor to cause the apparatus to perform the method of one or more of Aspects 15-27.

Aspect 34: A device for wireless communication, comprising a memory and one or more processors coupled to the memory, the one or more processors configured to perform the method of one or more of Aspects 15-27.

Aspect 35: An apparatus for wireless communication, comprising at least one means for performing the method of one or more of Aspects 15-27.

Aspect 36: A non-transitory computer-readable medium storing code for wireless communication, the code comprising instructions executable by a processor to perform the method of one or more of Aspects 15-27.

Aspect 37: A non-transitory computer-readable medium storing a set of instructions for wireless communication, the set of instructions comprising one or more instructions that, when executed by one or more processors of a device, cause the device to perform the method of one or more of Aspects 15-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one memory; and
   at least one processor communicatively coupled with the at least one memory, the at least one processor configured to cause the UE to:
      receive, from a network node, a configuration of a beam prediction model that is trained to predict beam measurements for a set of beams;
      receive, from the network node, an indication of a subset of beams, from the set of beams, that are to be associated with a measurement report, wherein one or more beams, of the set of beams, are to be disabled for the beam prediction model based at least in part on the indication of the subset of beams; and
      transmit, to the network node, the measurement report, wherein the measurement report indicates one or more predicted beam measurements that are based at least in part on an output of the beam prediction model, wherein the output of the beam prediction model includes first beam predictions associated with the set of beams, wherein the one or more predicted beam measurements include information associated with the subset of beams, and wherein the measurement report does not include second beam predictions associated with the one or more beams.

2. The UE of claim 1, wherein the at least one processor is further configured to cause the UE to:
   obtain, from the beam prediction model, the output of the beam prediction model including the first beam predictions; and
   refrain from including, in the measurement report, one or more beam predictions, from the output, that are not included in the subset of beams.

3. The UE of claim 1, wherein the indication of the subset of beams is included in a radio resource control communication, wherein the at least one processor is further configured to cause the UE to receive another indication of a different subset of beams, from the set of beams, that are to be associated with another measurement report.

4. The UE of claim 1, wherein the at least one processor is further configured to cause the UE to:
   receive an indication of one or more active reference signals from a set of configured reference signals, wherein the indication of the subset of beams is based at least in part on the subset of beams being associated with reference signals, from the set of configured reference signals, that are included in the one or more active reference signals.

5. The UE of claim 1, wherein, to cause the UE to receive the indication of the subset of beams, the at least one processor is configured to cause the UE to receive a respective indication, for each beam included in the set of beams, indicating whether the beam is disabled for the beam prediction model.

6. The UE of claim 1, wherein the indication of the subset of beams is included in the configuration of the beam prediction model.

7. The UE of claim 1, wherein the at least one processor is further configured to cause the UE to receive a measurement report configuration associated with the measurement report, the measurement report configuration including the indication of the subset of beams.

8. The UE of claim 1, wherein the at least one processor is further configured to cause the UE to receive an indication of an association between one or more candidate network nodes and respective beams included in the set of beams,
wherein, to cause the UE to receive the indication of the subset of beams, the at least one processor is configured to cause the UE to receive an indication that a candidate network node, from the one or more candidate network nodes, is available, wherein the candidate network node is associated with the subset of beams.

9. The UE of claim 1, wherein the at least one processor is further configured to cause the UE to receive an indication of one or more groups of beams from the set of beams,
wherein, to cause the UE to receive the indication of the subset of beams, the at least one processor is configured to cause the UE to receive an indication of a group, from the one or more groups, that is disabled for the beam prediction model, the group not including the subset of beams.

10. The UE of claim 1, wherein the at least one processor is further configured to cause the UE to receive an indication of a time domain availability pattern associated with the set of beams,
wherein the indication of the subset of beams is based at least in part on the time domain availability pattern indicating that the subset of beams is available or disabled for the beam prediction model at a current time.

11. The UE of claim 1, wherein the indication of the subset of beams that are to be associated with the measurement report includes an indication of the one or more beams.

12. A network node for wireless communication, comprising:
at least one memory; and
at least one processor communicatively coupled with the at least one memory, the at least one processor configured to cause the network node to:
transmit a configuration, associated with a user equipment (UE), of a beam prediction model that is trained to predict beam measurements for a set of beams;
transmit an indication, associated with the UE, of a subset of beams, from the set of beams, that are to be associated with a measurement report, wherein one or more beams, of the set of beams, are to be disabled for the beam prediction model based at least in part on the indication of the subset of beams; and
receive the measurement report, wherein the measurement report indicates one or more predicted beam measurements that are based at least in part on an output of the beam prediction model, wherein the output of the beam prediction model includes first beam predictions associated with the set of beams, wherein the one or more predicted beam measurements includes information associated with the subset of beams, and wherein the measurement report does not include second beam predictions associated with the one or more beams.

13. The network node of claim 12, wherein the indication of the subset of beams is included in a radio resource control communication, wherein the at least one processor is further configured to cause the network node to transmit another indication of a different subset of beams, from the set of beams, that are to be associated with another measurement report.

14. The network node of claim 12, wherein the at least one processor is further configured to cause the network node to:
transmit an indication of one or more active reference signals from a set of configured reference signals,
wherein the indication of the subset of beams is based at least in part on the subset of beams being associated with reference signals, from the set of configured reference signals, that are included in the one or more active reference signals.

15. The network node of claim 12, wherein, to cause the network node to transmit the indication of the subset of beams, the at least one processor is configured to cause the network node to transmit a respective indication, for each beam included in the set of beams, indicating whether the beam is disabled or active for the beam prediction model.

16. A method of wireless communication performed by a user equipment (UE), comprising:
receiving, from a network node, a configuration of a beam prediction model that is trained to predict beam measurements for a set of beams;
receiving, from the network node, an indication of a subset of beams, from the set of beams, that are to be associated with a measurement report, wherein one or more beams, of the set of beams, are to be disabled for the beam prediction model based at least in part on the indication of the subset of beams; and
transmitting, to the network node, the measurement report, wherein the measurement report indicates one or more predicted beam measurements that are based at least in part on an output of the beam prediction model, wherein the output of the beam prediction model includes first beam predictions associated with the set of beams, wherein the one or more predicted beam measurements include information associated with the subset of beams, and wherein the measurement report does not include second beam predictions associated with the one or more beams.

17. The method of claim 16, wherein the set of beams are associated with respective reference signal identifiers or respective transmission configuration indicator (TCI) states.

18. The method of claim 16, further comprising:
obtaining, from the beam prediction model, the output of the beam prediction model including the first beam predictions; and
refraining from including, in the measurement report, one or more beam predictions, from the output, that are not included in the subset of beams.

19. The method of claim 16, wherein the indication of the subset of beams is included in a radio resource control communication, the method further comprising receiving another indication of a different subset of beams, from the set of beams, that are to be associated with another measurement report.

20. The method of claim 19, wherein the other indication of the different subset of beams is included in a medium access control (MAC) control element communication or in a downlink control information communication.

21. The method of claim 16, wherein receiving the indication of the subset of beams comprises receiving a respective indication, for each beam included in the set of beams, indicating whether the beam is disabled for the beam prediction model.

22. The method of claim 16, wherein the indication of the subset of beams is included in the configuration of the beam prediction model.

23. The method of claim 16, wherein receiving the indication of the subset of beams comprises receiving a bitmap, associated with the set of beams, including indications for respective beams from the set of beams.

24. The method of claim 16, further comprising receiving an indication of an association between one or more candidate network nodes and respective beams included in the set of beams,
wherein receiving the indication of the subset of beams comprises receiving an indication that a candidate network node, from the one or more candidate network nodes, is available, wherein the candidate network node is associated with the subset of beams.

25. The method of claim 16, further comprising receiving an indication of one or more groups of beams from the set of beams,
wherein receiving the indication of the subset of beams comprises receiving an indication of a group, from the one or more groups, that is disabled for the beam prediction model, the group not including the subset of beams.

26. The method of claim 16, further comprising receiving an indication of a time domain availability pattern associated with the set of beams,
wherein the indication of the subset of beams is based at least in part on the time domain availability pattern indicating that the subset of beams is available or disabled for the beam prediction model at a current time.

27. The method of claim 16, wherein the indication of the subset of beams that are to be associated with the measurement report includes an indication of the one or more beams.

28. A method of wireless communication performed by a network node, comprising:
transmitting a configuration, associated with a user equipment (UE), of a beam prediction model that is trained to predict beam measurements for a set of beams;
transmitting an indication, associated with the UE, of a subset of beams, from the set of beams, that are to be associated with a measurement report, wherein one or more beams, of the set of beams, are to be disabled for the beam prediction model based at least in part on the indication of the subset of beams; and
receiving the measurement report, wherein the measurement report indicates one or more predicted beam measurements that are based at least in part on an output of the beam prediction model, wherein the output of the beam prediction model includes first beam predictions associated with the set of beams, wherein the one or more predicted beam measurements including information associated with the subset of beams, and wherein the measurement report does not include second beam predictions associated with the one or more beams.

29. The method of claim 28, further comprising:
transmitting an indication of one or more active reference signals from a set of configured reference signals,
wherein the indication of the subset of beams is based at least in part on the subset of beams being associated with reference signals, from the set of configured reference signals, that are included in the one or more active reference signals.

30. The method of claim 28, further comprising transmitting an indication of one or more groups of beams from the set of beams,
wherein transmitting the indication of the subset of beams comprises transmitting an indication of a group, from the one or more groups, that is disabled for the beam prediction model, the group not including the subset of beams.

* * * * *